US011425343B2

(12) United States Patent
Osmanis et al.

(10) Patent No.: US 11,425,343 B2
(45) Date of Patent: Aug. 23, 2022

(54) DISPLAY SYSTEMS, PROJECTION UNITS AND METHODS FOR PRESENTING THREE-DIMENSIONAL IMAGES

(71) Applicant: Lightspace Technologies, SIA, Marupes novads (LV)

(72) Inventors: Ilmārs Osmanis, Mārupes novads (LV); Roberts Zabels, Riga (LV); Krišs Osmanis, Babītes novads (LV); Mārtiņš Narels, Riga (LV); Uģis Gertners, Riga (LV); Rendijs Smukulis, Riga (LV); Mārcis Greitāns, Garkalnes Novads (LV)

(73) Assignee: Lightspace Technologies, SIA, Marupe (LV)

( * ) Notice: Subject to any disclaimer, the term of this patent is extended or adjusted under 35 U.S.C. 154(b) by 0 days.

(21) Appl. No.: 16/903,038

(22) Filed: Jun. 16, 2020

(65) Prior Publication Data
US 2021/0392305 A1    Dec. 16, 2021

(51) Int. Cl.
*H04N 9/31*        (2006.01)
*H04N 13/161*      (2018.01)
(Continued)

(52) U.S. Cl.
CPC ........... *H04N 9/3126* (2013.01); *G02B 30/33* (2020.01); *H04N 9/3152* (2013.01);
(Continued)

(58) Field of Classification Search
CPC .. H04N 9/3126; H04N 13/178; H04N 13/161; H04N 9/3152; H04N 9/3185; G02B 30/33
See application file for complete search history.

(56) References Cited

U.S. PATENT DOCUMENTS

| 6,416,181 B1 * | 7/2002 | Kessler | G02B 30/26 |
| | | | 353/7 |
| 7,777,945 B2 * | 8/2010 | Whitehead | H05B 45/20 |
| | | | 359/443 |

(Continued)

FOREIGN PATENT DOCUMENTS

| EP | 2618587 A1 | 7/2013 |
| WO | 2019221993 A1 | 11/2019 |
| WO | 2020046259 A1 | 3/2020 |

OTHER PUBLICATIONS

Dodgson, Neil A, "On the number of viewing zones required for head-tracked autostereoscopic display", Proc. SPIE 6055, Stereoscopic Displays and Virtual Reality Systems XIII, XP055076972, DOI:: 10.1117/12.641390, Jan. 27, 2006, 12 pages.

(Continued)

*Primary Examiner* — Magda Cruz
(74) *Attorney, Agent, or Firm* — Ziegler IP Law Group, LLC

(57) ABSTRACT

A display system for presenting three-dimensional images. The display system includes projection unit including projection subassemblies, wherein each projection subassembly includes array of point-like light sources, spatial light modulator and controller; projection screen; and processor. The processor is configured to: process three-dimensional data pertaining to a scene to generate image data of three-dimensional image; and display three-dimensional image, via projection subassemblies of the projection unit, wherein, in each of projection subassemblies, the controller is configured to multiplex operations of individual point-like light sources of the array and the spatial light modulator in a time-sequential manner, based on the image data of three-dimensional image, to display a plurality of segments of three-dimensional image sequentially.

21 Claims, 8 Drawing Sheets

(51) Int. Cl.
*G02B 30/33* (2020.01)
*H04N 13/178* (2018.01)

(52) U.S. Cl.
CPC ......... *H04N 9/3185* (2013.01); *H04N 13/161* (2018.05); *H04N 13/178* (2018.05)

(56) References Cited

U.S. PATENT DOCUMENTS

| | | | | |
|---|---|---|---|---|
| 10,701,326 | B1* | 6/2020 | Osmanis | H04N 13/302 |
| 2004/0108971 | A1* | 6/2004 | Waldern | G02B 27/017 |
| | | | | 345/8 |
| 2005/0018288 | A1 | 1/2005 | Redert | |
| 2005/0213182 | A1* | 9/2005 | Cossairt | G02B 30/54 |
| | | | | 359/244 |
| 2008/0042924 | A1* | 2/2008 | Lee | G09G 3/003 |
| | | | | 345/4 |
| 2011/0228042 | A1* | 9/2011 | Gao | G02B 30/56 |
| | | | | 348/36 |
| 2012/0224038 | A1* | 9/2012 | Roth | H04N 13/32 |
| | | | | 348/55 |
| 2013/0181895 | A1* | 7/2013 | Kim | G09G 3/34 |
| | | | | 345/156 |
| 2013/0194252 | A1 | 8/2013 | Kim et al. | |
| 2016/0252759 | A1* | 9/2016 | Woodgate | G02F 1/13338 |
| | | | | 348/54 |
| 2021/0109363 | A1* | 4/2021 | Lyubarsky | G02B 26/0833 |
| 2021/0136332 | A1* | 5/2021 | Takashima | G01S 17/42 |

OTHER PUBLICATIONS

Notification of Transmittal of The International Search Report and The Written Opinion of The International Searching Authority, or the Declaration, Application No. PCT/EP2021/064935, dated Aug. 26, 2021, 15 pages.

* cited by examiner

DISPLAY SYSTEMS, PROJECTION UNITS AND METHODS FOR PRESENTING THREE-DIMENSIONAL IMAGES

TECHNICAL FIELD

The present disclosure relates generally to display systems; and more specifically, to display systems for presenting three-dimensional images. The present disclosure also relates to methods for presenting three-dimensional images, the methods being implemented by projection units. The present disclosure also relates to projection units.

BACKGROUND

In recent times, increasing developments are being made for representation of three-dimensional (3D) imagery. As perceptually 3D images carry considerably more information than their two-dimensional (2D) counterparts, display systems are being developed to realistically represent said 3D images.

Currently, various types of display systems are being employed to produce 3D images. One type of display systems employs stereoscopic displays, which output a set of stereoscopic image pairs to a viewer. Typically, such display systems require an eyewear, which is used to demultiplex stereoscopic images presented on a display screen. The eyewear can be a pair of glasses or a headset utilizing optical elements (for example, such as colored filters, passive polarization filters, active liquid crystal shutters, and the like) which are synchronized to the display screen. Another type of display systems employs autostereoscopic displays. Autostereoscopic displays are of various types, for example, such as volumetric displays for displaying volumetric images to the viewer. The volumetric displays employ several general approaches for generating the volumetric images. Among these approaches is rear projection in conjunction with a mechanically swept diffuser screen (either rotating or reciprocating) or stacked electrically switchable optical diffuser elements which define a projection volume. Another type of autostereoscopic displays employ densely packed light rays to approximate light within a 3D scene.

However, conventional display systems suffer from certain limitations. As an example, as stereoscopic display-based display systems generally utilize the single display screen, there is introduced vergence-accommodation conflict. Notably, in such display systems, vergence cues are changing while accommodation cues have to be fixed at a distance of a plane of the display screen. As a result, such display systems introduce unpleasant sensation to a large audience of viewers, can strain eyes of the viewers, and require higher mental effort to identify depth, when used for professional tasks. As another example, volumetric display-based display systems have limited capability of showing viewing angle dependent lighting effects (for example, such as glare, reflections, and the like) as they can be visible only from certain viewing angles. As yet another example, autostereoscopic displays that approximate light within the 3D scene suffer from issues such as making a compromise between a number of generated views of the 3D scene and image resolution (wherein either a low number of views can be generated which doesn't approximate the light within the 3D scene to a sufficient quality and thus introduces image artefacts, or alternatively that the obtained effective image resolution is low and doesn't meet currently acceptable standards), non-uniform illumination, complexity, large physical footprint, high cost, bulky size, and high power consumption.

Therefore, in light of the foregoing discussion, there exists a need to overcome the aforementioned drawbacks associated with existing display systems for producing 3D images.

SUMMARY

The present disclosure seeks to provide a display system for presenting three-dimensional images. The present disclosure also seeks to provide a method for presenting three-dimensional images, the method being implemented by a projection unit. The present disclosure seeks to provide a solution to the existing problems of vergence-accommodation conflict, complex system design, high cost, suboptimal provision of viewing angle dependent lighting effects, low image resolution, and the like, in conventional display systems. An aim of the present disclosure is to provide a solution that overcomes at least partially the problems encountered in prior art, and provides a display system that is free from vergence-accommodation conflict, has high image resolution, has uniform illumination, low complexity, small physical footprint, low cost, compact size, and low power consumption.

In one aspect, an embodiment of the present disclosure provides a display system for presenting three-dimensional images, the display system comprising:
 a projection unit comprising one or more projection subassemblies, wherein each of the one or more projection subassemblies comprises an array of point-like light sources, a spatial light modulator and a controller;
 a projection screen; and
 a processor configured to:
 process three-dimensional data pertaining to a scene to generate image data of a given three-dimensional image; and
 display the given three-dimensional image, via the one or more projection subassemblies of the projection unit, wherein, in each of the one or more projection subassemblies, the controller is configured to multiplex operations of individual point-like light sources of the array and the spatial light modulator in a time-sequential manner, based on the image data of the given three-dimensional image, to display a plurality of segments of the given three-dimensional image sequentially.

In another aspect, an embodiment of the present disclosure provides a projection unit comprising:
 one or more projection subassemblies, wherein each of the one or more projection subassemblies comprises:
 an array of point-like light sources;
 at least one spatial light modulator; and
 a controller; and
 a processor configured to:
 process three-dimensional data pertaining to a scene to generate image data of a given three-dimensional image; and
 display the given three-dimensional image, via the one or more projection subassemblies, wherein, in each of the one or more projection subassemblies, the controller is configured to multiplex operations of individual point-like light sources of the array and the at least one spatial light modulator in a time-sequential manner, based on the image data of the given three-dimensional image, to display a plurality of segments of the given three-dimensional image sequentially.

In yet another aspect, an embodiment of the present disclosure provides a method for presenting three-dimensional images, the method being implemented by a projection unit, the method comprising:

processing three-dimensional data pertaining to a scene to generate image data of a given three-dimensional image; and displaying the given three-dimensional image, via one or more projection subassemblies of the projection unit, each of the one or more projection subassemblies comprising an array of point-like light sources, at least one spatial light modulator and a controller, wherein the step of displaying comprises multiplexing operations of individual point-like light sources of the array and the at least one spatial light modulator in a time-sequential manner, via the controller based on the image data of the given three-dimensional image, to display a plurality of segments of the given three-dimensional image sequentially.

Embodiments of the present disclosure substantially eliminate or at least partially address the aforementioned problems in the prior art, and enable provision of realistic three-dimensional images having high image quality, via a simple and efficient display system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
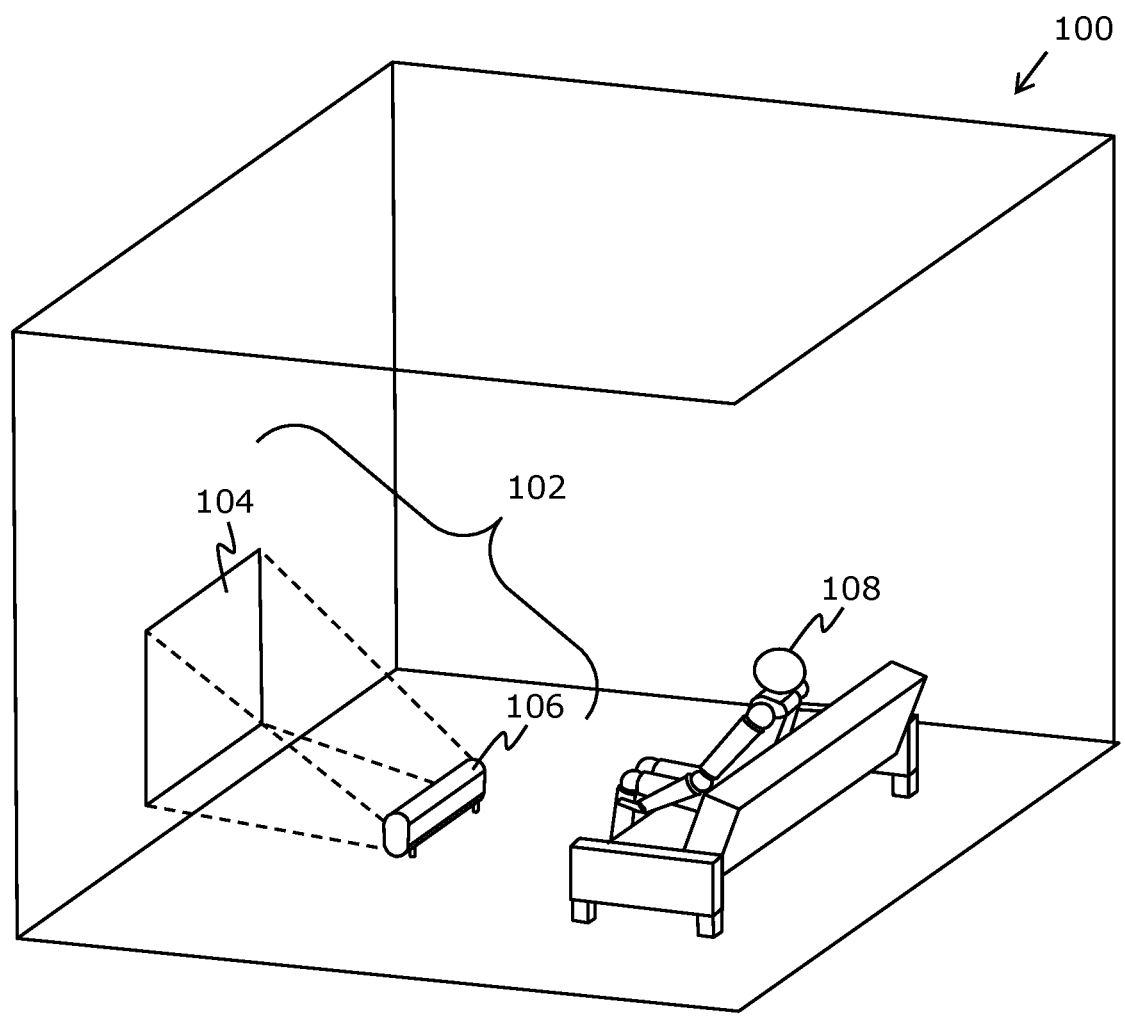
FIG. 1 illustrates an exemplary environment in which a display system for presenting three-dimensional images is used, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display system for presenting three-dimensional images, the display system comprising:

a projection unit comprising one or more projection subassemblies, wherein each of the one or more projection subassemblies comprises an array of point-like light sources, a spatial light modulator and a controller;

a projection screen; and a processor configured to:

process three-dimensional data pertaining to a scene to generate image data of a given three-dimensional image; and display the given three-dimensional image, via the one or more projection subassemblies of the projection unit, wherein, in each of the one or more projection subassemblies, the controller is configured to multiplex operations of individual point-like light sources of the array and the spatial light modulator in a time-sequential manner, based on the image data of the given three-dimensional image, to display a plurality of segments of the given three-dimensional image sequentially.

In another aspect, an embodiment of the present disclosure provides a projection unit comprising:

one or more projection subassemblies, wherein each of the one or more projection subassemblies comprises:

an array of point-like light sources;

at least one spatial light modulator; and a controller; and a processor configured to:

process three-dimensional data pertaining to a scene to generate image data of a given three-dimensional image; and display the given three-dimensional image, via the one or more projection subassemblies, wherein, in each of the one or more projection subassemblies, the controller is configured to multiplex operations of individual point-like light sources of the array and the at least one spatial light modulator in a time-sequential manner, based on the image data of the given three-dimensional image, to display a plurality of segments of the given three-dimensional image sequentially.

In yet another aspect, an embodiment of the present disclosure provides a method for presenting three-dimensional images, the method being implemented by a projection unit, the method comprising:

processing three-dimensional data pertaining to a scene to generate image data of a given three-dimensional image; and displaying the given three-dimensional image, via one or more projection subassemblies of the projection unit, each of the one or more projection subassemblies comprising an array of point-like light sources, at least one spatial light modulator and a controller, wherein the step of displaying comprises multiplexing operations of individual point-like light sources of the array and the at least one spatial light modulator in a time-sequential manner, via the controller based on the image data of the given three-dimensional image, to display a plurality of segments of the given three-dimensional image sequentially.

The present disclosure provides the aforementioned display system, the aforementioned projection unit and the aforementioned method. The display system has a simple design as it requires a small number of components for implementation. The display system provides high resolution of the given 3D image, uniform image brightness across an area of the projection screen as well as over multiple viewing angles. Therefore, the display system provides a high image quality at low cost, low power consumption and an overall simple system configuration. The display system is free from vergence-accommodation conflict. The 3D images produced by the display system are highly realistic and convey 3D qualities (for example, such as horizontal parallax) of the given 3D image directly to viewers' eyes from all viewing angles, and without requiring any additional viewing aids. The display system is compact and easy to use.

Throughout the present disclosure, the term "display system" refers to a specialized equipment that is employed for presenting the three-dimensional (3D) images to at least one viewer when the display system, in operation is used by the at least one viewer. The display system acts as a display device that is operable to present the 3D images to the at least one viewer. The display system presents the 3D images with relevant depth clues. It will be appreciated that the display system presents the 3D images without requiring the at least one viewer to wear any additional aids (for example, such as glasses, headgear, and the like). Therefore, the display system can be considered to be an autostereoscopic display system. Herein, the term "at least one viewer" refers to "one viewer" in some use-cases, and "a plurality of viewers" in other use-cases. The display system is capable of presenting (namely, conveying) the 3D images to a single viewer, as well as to multiple viewers.

The 3D images presented by the display system are perceptually three-dimensional. The 3D images carry considerably more information as compared to their two-dimensional (2D) counterparts. It will be appreciated that the display system is capable of presenting a single 3D image (namely, a static 3D image), as well as a sequence of 3D images (namely, a 3D video). The sequence of 3D images is a stream multiple static 3D images.

In an example, the display system may present a static 3D image of a 3D object (for example, such as a statue, a monument, a model of a machine, and the like). In another example, the display system may present a 3D video (for example, such as a 3D movie, a 3D educational video, a 3D game, a 3D simulation, and the like).

Throughout the present disclosure, the term "projection unit" refers to specialized equipment for projecting light towards the projection screen. The projection unit comprises the one or more projection subassemblies that, in operation, emit light rays towards the projection screen for displaying the 3D images. Herein, the term "projection subassembly" refers to a collection of components assembled together for projection as a single unit, wherein said unit is to be incorporated into the projection unit.

It will be appreciated that "one or more projection subassemblies" refers to "one projection subassembly" in some implementations, and to "a plurality of projection subassemblies" in other implementations.

Throughout the present disclosure, the term "point-like light source" refers to a light source that is defined by a single point in space or appears to be defined by a single point in space. The point-like light sources may be understood to be "pin-like light sources". It will be appreciated that the point-like light sources may be implemented as ideal point light sources, or as non-ideal point light sources. Optionally, when the point-like light sources are implemented as non-ideal point light sources, light beams emitted by the non-ideal point light sources are specifically structured to emulate light beams emitted by point light sources.

The array of point-like light sources can be understood to be an illumination assembly (namely, a light source module) of a corresponding projection subassembly It will be appreciated that the array of point-like light sources may be implemented as a one-dimensional (1D) array, a 2D array, or a 3D array of point-like light sources.

Optionally, a diameter of a given point-like light source lies in a range of 1 μm to 300 μm. For example, the diameter of the given point-like light source may be from 1, 20, 30, 40, 50, 60, 70, 80, 90, 100, 110, 120, 130, 140, 150, 160, 170, 180, 190, 200, 210, 220, 230, 240, 250, 260, 270, 280, or 290 μm (micrometres) up to 30, 40, 50, 60, 70, 80, 90, 100, 110, 120, 130, 140, 150, 160, 170, 180, 190, 200, 210, 220, 230, 240, 250, 260, 270, 280, 290, or 300 μm. It will be appreciated that when the diameter of the given point-like light source lies within the aforesaid range, the given point-like light source may be understood to be "a point-sized light source".

Alternatively, optionally, when a given point-like light source is implemented as a non-ideal point light source, a diameter of the given point-like light source is greater than 300 μm. Optionally, in this regard, each of the one or more projection subassemblies further comprises an aperture or an optical element (for example, such as a lens system, a reflector, and the like) arranged on an optical path of a light beam emitted by the non-ideal point light source, wherein the aperture or the optical element shapes the light beam emitted by the non-ideal point light source into a structured light beam which appears to be emanating from a point light source having a diameter lying in a range of 20 μm to 300 μm. In an example, the given point-like light source may be implemented as the non-ideal point light source which is shadowed by a mask (serving as the aperture) lying on the optical path of the light beam emitted by the non-ideal point light source, wherein the mask has a pinhole of a diameter lying in the range of 20 µm to 300 µm. In general dimensions depends on the size of the spatial light modulator (SLM), the size of the point-like light source and the distance of the light source from the SLM. In deed if the light source is large and close to SLM the light source is might not work as a point-like source. On the other hand if the light source is large and far away from SML the same light source could work as a point light source.

Optionally, a wavelength of a light beam emitted by a given point-like light source is monochromatic. Alternatively, optionally, a wavelength of a light beam emitted by a given point-like light source is polychromatic. As an example, the given point-like light source may emit a polychromatic white light beam. It will be appreciated that the polychromatic wavelength may have any number of wavelengths.

Optionally, a wavelength of a light beam emitted by a given point-like light source lies within visible electromagnetic spectrum and is one of tristimulus wavelengths. Optionally, in this regard, the tristimulus wavelengths comprise: a wavelength corresponding to red light, a wavelength corresponding to green light, a wavelength corresponding to blue light. When the point-like light sources of the array emit light corresponding to the tristimulus wavelengths, the one or more projection subassemblies provide true colour representation ability. Moreover, optionally, the point-like light sources are well-aligned with each other to ensure proper true colour representation ability. It will be appreciated that the wavelength of the light beam emitted by the given point-like light source could be a wavelength corresponding to any colour band of the visible electromagnetic spectrum in addition to or apart from the tristimulus wavelengths.

In an embodiment, the point-like light sources of the array are implemented by using at least one laser source, at least one optical de-multiplexer and a plurality of optical fibres. In such a case, the at least one laser source, in operation, emits a light beam towards the at least one optical de-multiplexer. The light beam has high brightness. The at least one optical de-multiplexer is configured to divert the light beam incident thereupon into one of a plurality of optical paths, at a given time. In other words, the at least one optical de-multiplexer is configured to modify the optical path of the light beam incident thereupon in a time-sequential manner. Upon diversion from the at least one optical de-multiplexer, the light beam is considered to be a diverted light beam. Therefore, the at least one optical de-multiplexer is configured to produce a plurality of diverted light beams in the time-sequential manner. The plurality of optical fibres are arranged on the plurality of optical paths. A given diverted light beam is coupled into (namely, injected into) its corresponding optical fibre either directly, or via in-coupling optics. The given diverted light beam then travels through its corresponding optical fibre towards an illumination assembly of a corresponding projection subassembly. It will be appreciated that such an embodiment of implementing the point-like light sources of the array is beneficial in reducing a number of light sources required in the one or more projection subassemblies, as the at least one optical de-multiplexer produces the plurality of diverted light beams from a single light beam. In this way, the one or more projection subassemblies can be designed to have a simple configuration of constituent elements, be compact (as the number of light sources is reduced), be cost-efficient (as cost would reduce due to the reduction in the number of light sources), have a small physical footprint, and have a low power consumption. Optionally, when a wavelength of the light beam emitted by the at least one laser source is one of the tristimulus wavelengths, the number of light sources in the one or more projection subassemblies is reduced at least by a factor of 3.

Optionally, the light beam emitted by the at least one laser source is substantially collimated.

Optionally, the point-like light sources of the array are further implemented as an optical element for shaping a light beam emanating from the at least one laser source.

Optionally, the at least one optical de-multiplexer is implemented as at least one electromechanical beam actuator. As an example, a given electromechanical beam actuator may be implemented as a micro-electromechanical system (MEMS) mirror which is electrically driven (by the processor of the display system) to divert the light beam into one of the plurality of optical paths.

Optionally, the at least one optical de-multiplexer is arranged in a cascaded form to implement at least one primary optical de-multiplexer arranged on the optical path of the light beam emitted by the at least one laser source, and at least one secondary optical de-multiplexer arranged on an optical path of the plurality of diverted light beams, the at least one secondary optical de-multiplexer arranged at exit ends of the plurality of optical fibres. In this way, the point-like light sources for the one or more projection subassemblies can be derived from the at least one laser source. This enables further reduction in the number of required laser sources in the projection unit.

Optionally, when a wavelength of the light beam emitted by the at least one laser source is one of the tristimulus wavelengths, the at least one primary optical de-multiplexer is configured to divert the light beam incident thereupon in a time-to sequential manner such that one or more spatial light modulators of the one or more projection subassemblies are illuminated with a required tristimulus wavelength for a required period of time. This ensures even illumination of the one or more spatial light modulators from frame to frame, along with substantially consistent colour balance across different frames. Herein, the term "frame" refers to a given 3D image.

In an example, the point-like light sources of the array may be implemented by using three laser sources, an optical de-multiplexer, and five optical fibres. The three laser sources may be a red laser source, a green laser source, and a blue laser source. Using optical de-multiplexing described above, up to 15 point-like light sources of the array may be implemented using just the three laser sources (notably, by directing light beams emitted by each of the three laser sources into five diverted light beams).

In another embodiment, a given point-like light source of the array is implemented as a light-emitting diode (LED). Optionally, the given point-like light source of the array is further implemented as an optical element for shaping a light beam emanating from the LED.

In yet another embodiment, a given point-like light source of the array is implemented as a solid-state light emitter. Optionally, a diameter of an active region of the solid-state light emitter lies in a range of 20 µm-300 µm. The solid-state light emitter may, for example, be a solid-state laser. Optionally, the given point-like light source of the array is further implemented as an optical element for shaping a light beam emanating from the solid-state light emitter.

In yet another embodiment, a given point-like light source of the array is implemented as:
 at least one of: a super-luminescent light-emitting diode, a cluster of super-luminescent light-emitting diodes, a laser diode, a cluster of laser diodes; and
 an optical element for shaping a light beam.

Optionally, the optical element is employed for shaping a light beam emanating from the at least one of: a super-luminescent light-emitting diode, a cluster of super-luminescent light-emitting diodes, a laser diode, a cluster of laser diodes.

Optionally, the super-luminescent light-emitting diode (SLED) serves as a light source that combines traits of a laser diode and a conventional LED. In particular, the SLED has traits such as high power, high brightness, and strict directionality (with light beam divergence angles comparable to that of solid-state laser diodes) that are associated with the laser diode, whilst also having spectral distribution similar to that of the conventional LED. The spectral distribution of the SLED eradicated adverse effects associated to laser speckle.

It will be appreciated that when the cluster of SLEDs is optionally employed to implement the given point-like light source of the array, an arrangement of individual SLEDs in the cluster may be well-defined or arbitrary. In an embodiment, the cluster of SLEDs has a circular arrangement of the individual SLEDs. The cluster of SLEDs has higher output power as compared to a single SLED. Optionally, when different individual SLEDs of the cluster of SLEDs emit light beams of different wavelengths, the different wavelengths are mixed together. As an example, the cluster of SLEDs may comprise six SLEDs arranged in the circular arrangement, wherein the six SLEDs comprise two SLEDs that emit red light beams, two SLEDs that emit green light beams, and two SLEDs that emit blue light beams.

Optionally, the optical element for shaping the light beam is implemented as at least one of: a micro-optical element, a holographical optical element, a metasurface. In an example, said optical element is implemented as a plurality of microlenses.

It will be appreciated that the optical element for shaping the light beam optionally derives an efficient illumination cone for the spatial light modulator. Said optical element gathers light beam(s) emitted by at least one of: the SLED, the cluster of SLEDs, the laser diode, the cluster of laser diodes, and shapes the light beam(s) into a pyramidal light cone or an efficient circular cone. Additionally, optionally, said optical element homogenizes illumination and mixes the different wavelengths of the light beams (emitted by the different individual SLEDs or different individual laser diodes) when the cluster of SLEDs or the cluster of laser diodes is employed. The pyramidal light cone mimics emergence of light from a near-ideal point light source. The pyramidal light cone has a rectangular-shaped base, and is desirable when it is required to minimize light loss (namely, light spill) when illuminating a rectangular spatial light modulator. Additionally a regular cone is possible to mimic emergence of light from a near-ideal point light source.

In an example, the given point-like light source may be implemented as at least one of: the laser diode, the cluster of laser diodes. The laser diode or the cluster of laser diodes may correspond to light emitter(s) of a horizontal cavity surface emitting laser (HCSEL) or a vertical cavity surface emitting laser (VCSEL).

In some implementations, each projection subassembly (of the one or more projection subassemblies) comprises a single spatial light modulator. The spatial light modulator, in operation, modulates light incident thereupon. The spatial light modulator may be a transmissive-type spatial light modulator, or a reflective-type spatial light modulator.

Optionally, each of the one or more projection subassemblies comprises at least one additional spatial light modulator. In such implementations, each projection subassembly comprises a plurality of spatial light modulators (notably, the single spatial light modulator along with the at least one additional spatial light modulator). It will be appreciated that such implementations of the plurality of spatial light modulators in each projection subassembly may be employed in an automotive head-up display system.

Optionally, the spatial light modulator and/or the at least one additional spatial light modulator is implemented as at least one of: a digital micromirror device (DMD), a micro-electromechanical system (MEMS) device, a liquid crystal on silicon (LCoS) type modulator, a transmissive liquid crystal display (LCD). It will be appreciated that the spatial light modulator and/or the at least one additional spatial light modulator can also be implemented as any other type of spatial light modulator that is capable of operating with external light sources.

In an example, the spatial light modulator may be implemented as a transmissive-type spatial light modulator, such as the transmissive LCD. In another example, the spatial light modulator may be implemented as a reflective-type spatial light modulator, such as the DMD® or the LCoS type modulator.

Optionally, the spatial light modulator and/or the at least one additional spatial light modulator operates in a field-sequential manner. Such a field-sequential manner of operation allows for reducing a required number of point-like light sources.

Optionally, the one or more projection subassemblies are focus invariant. The nature of the point-like light sources of the array (notably, the size of the point-like light sources of the array) in comparison to dimensions of the spatial light modulator ensures that the one or more projection subassemblies are focus invariant (namely, focus-free). In particular, the size of the point-like light sources is very small in comparison to the size of the spatial light modulator. Irrespective of where the projection screen is placed, the given 3D image will appear sharp to the at least one viewer of the display system.

Throughout the present disclosure, the term "controller" refers to a specialized computational unit that is configured to control the array of point-like light sources and the spatial light modulator of the one or more projection subassemblies, in a synchronized manner. In this regard, the controller is communicably coupled to both the array of point-like light sources and the spatial light modulator. The controller is the control logic of the one or more projection subassemblies. In an embodiment, the controller is implemented as hardware, software, firmware, or a combination of these.

Optionally, the controller is configured to perform partially or in full processing operations of the processor (of the display system).

Optionally, the controller is configured to perform at least one graphical data processing operation. Optionally, the at least one graphical data processing operation comprises at least one of: decoding the image data of the given 3D image, formatting the image data of the given 3D image in accordance with requirements of the spatial light modulator, performing graphical data interpretation and redistribution to the spatial light modulator, rendering the image data of the given 3D image at the spatial light modulator.

Optionally, each of the one or more projection subassemblies further comprises a control circuit that is to be employed to control the operation of the point-like light sources of the array. The control circuit can be understood to be "driving electronics" of the point-like light sources of the array. Optionally, the control circuit is implemented as hardware, software, firmware, or a combination of these.

Optionally, the control circuit is communicably coupled to both the point-like light sources of the array and the controller.

Optionally, the controller is coupled to the array of point-like light sources, via the control circuit. In this regard, the controller controls the operation of the array of point-like light sources, using the control circuit. The controller provides a control signal to the control circuit for operating the point-like light sources in a required manner, and the control signal generates drive signals for the individual point-like light sources of the array, based on the control signal. The controller is communicably coupled to the control circuit.

The projection screen (of the display system) is a screen that is used for displaying the 3D image for presentation to the at least one viewer of the display system. The projection screen may be understood to be a "diffusion screen" or a "diffusing screen".

Optionally, the projection screen is implemented as an anisotropic elliptical diffuser. The anisotropic elliptical diffuser spreads light unequally along different axes. In particular, the anisotropic elliptical diffuser spreads light primarily along a first axis, while spreading light minimally along a second axis that is perpendicular to the first axis. Alternatively, optionally, the projection screen is implemented as an isotropic diffuser. The isotropic diffuser spreads light equally along all directions. Such an implementation of the projection screen may be beneficial when the display system is arranged in the middle of a real-world environment (for example, such as a centre of a room).

Optionally, the projection screen is actively switchable between a transmissive mode and a reflective mode. In the transmissive mode, the projection screen has forward light-scattering properties (namely, the projection screen forward scatters light rays incident thereupon). In the reflective mode, the projection screen has backward light-scattering properties (namely, the projection screen back scatters light rays incident thereupon). The reflective mode of the projection screen is implemented via a passive light reflective layer within the projection screen. Notably, composition of the projection screen serves as a criteria for switching the projection screen to operate in either the transmissive mode or the reflective mode. It will be appreciated that the optional active switchability of the projection screen adds versatility for utilization of the display system in various real-world environments. As an example, when the display system is to be used in a large real-world environment where space is not a constraint, the projection screen can be used in the transmissive mode. As another example, when the display system is to be used in a small real-world environment where space is limited, the projection screen can be used in the reflective mode.

In an embodiment, the at least one viewer switches the projection screen between the transmissive mode and the reflective mode. In another embodiment, the processor is configured to switch the projection screen between the transmissive mode and the reflective mode. In such an embodiment, the processor is coupled to the projection screen. In yet another embodiment, the projection screen intelligently switches itself between the transmissive mode and the reflective mode.

Optionally, the projection screen comprises at least one of: a layer of diffractive optical element, a volume hologram, a metasurface, a layer of liquid crystal cells. Optionally, at least one of: the layer of diffractive optical element, the volume hologram, the metasurface, the layer of liquid crystal cells, serves as an active layer of the projection screen, which enables the projection screen to actively switch between the transmissive mode and the reflective mode. Moreover, optionally, at least one of: the layer of diffractive optical element, the volume hologram, the metasurface, the layer of liquid crystal cells, serves as at least one functional layer that performs at least one function in respect of the light rays incident upon the projection screen, the at least one functional layer being coupled to the active layer. The at least one function may, for example, be diffusing the light rays, modifying an angle of transmission or reflectance, diverting the light rays, compensating for optical aberrations and image inconsistencies, and the like. As an example, the at least one functional layer may be implemented as at least one of: a passive layer of micro-optics, a passive holographical optical element, a passive metasurface. As another example, the at least one functional layer may be implemented as at least one of: an active metasurface, an active holographical optical element, an active (for example, liquid-crystal based) microoptical array.

Further optionally the projector screen could be implemented as switching-, active- or variable-metasurface. The metasurface refers to a surface which can change its optical properties upon application of for example electric field (induced by voltage or current). As an example diversion angle of diffused light changes when an electric field is applied. Additional example is that when the metasurface is switched different wavelengths (light of different color) might be more effectively diffused and diverted towards desired direction. Further more the control logic also has to synchronize operation of such screen with the output of images (modulation of light). In deed optionally the projector screen is a metasurface screen which is actively switched between states. The term between states can refer change from one diversion angle to a second diversion angle or for example of diverting certain wavelength to a first direction and then to the second direction.

In an example, the projection screen may comprise the layer of liquid crystal cells, which serves as the active layer. The liquid crystal cells can be electrically switched (for example, by the processor) between two optical states. The two optical states comprise a first optical state that is associated with a first refractive index, and a second optical state that is associated with a second refractive index. When the liquid crystal cells are coupled with a solid substrate (which is, for example filled in the liquid-crystal cell), it is possible to attenuate a refractive index of the substrate to match that of the liquid crystal in either state. Alternatively, it is possible to tailor properties of the liquid crystal cells to match either of its optical states to match the refractive index of the substrate. In a case when the liquid crystal cells are in an optical state whose refractive index matches that of the substrate, light rays incident upon the liquid crystal cells can pass (namely, transmit) through the liquid crystal cells without substantially interacting. In another case when the liquid crystal cells are switched to an optical state where their refractive index is substantially different from that of the substrate, the liquid crystal cells facilitate reflection of light rays (for example, from an interface of the substrate and the liquid crystal cells). When the liquid crystal cells are patterned, they can be used for modifying light ray propagation therethrough. The liquid crystal cells additionally, optionally, comprise one or more functional layers besides the substrate. For example, the liquid crystal cells comprise transparent electrodes and liquid crystal, to facilitate reflection of the light rays in the reflective mode (also known as a reflecting state) and transmission of the light rays in the transmissive mode (also known as a transparent state). In one embodiment the liquid crystal cells are actively driven.

In another embodiment, the liquid crystal cells are bistable. In such a case, the liquid crystal cells only consume power during the process of optical transition.

Optionally, when the projection screen operates in the reflective mode, light rays emitted from the projection unit towards the projection screen is reflected from the projection screen to be directed towards an eye box. At the eye box, the at least one viewer can observe the given 3D image produced by the display system.

Optionally, the projection screen comprises at least one layer of optical elements that are employed to modify an angle of transmission or reflectance of a given light ray emanating from a given projection subassembly and incident upon the projection screen, based on a location on the projection screen at which the given light ray is incident and a relative position and orientation of the given projection subassembly with respect to the projection screen.

In this regard, the projection screen optionally possesses angle-modification capabilities, due to presence of the at least one layer of optical elements. In the absence of the at least one layer of optical elements, the given light ray, on being incident upon the projection screen, would have been transmitted or reflected along an expected optical path. In such a case, the angle of transmission or reflectance of the given light ray would be determined using an angle of incidence of the given light ray upon the projection screen. Typically, the angle of transmission or reflectance of the given light ray is equal to the angle of incidence of the given light ray. However, when the projection screen comprises at least one layer of optical elements, the optical elements of the at least one layer modify the angle of transmission or reflectance of the given light ray. Therefore, in such a case, the angle of transmission or reflectance of the given light ray would be unequal to the angle of incidence of the given light ray.

Optionally, the angle of transmission or reflectance of the given light ray is greater than the angle of incidence of the given light ray. Alternatively, optionally, the angle of transmission or reflectance of the given light ray is smaller than the angle of incidence of the given light ray.

Optionally, the angle of transmission or reflectance of the given light ray is modified to expand a field of view of the given 3D image. Alternatively, optionally, the angle of transmission or reflectance of the given light ray is modified to limit a field of view of the given 3D image to lie within an eye-box of the at least one viewer.

It will be appreciated that the optional modification of the angle of transmission or reflectance of the given light ray is based on the location on the projection screen at which the given light ray is incident and the relative position and orientation of the given projection subassembly with respect to the projection screen. The transmission or reflection characteristics of the projection screen vary across different locations (namely, regions) of the projection screen. In other words, the given light ray would be transmitted or reflected differently from different locations of the projection screen. The relative position and orientation of the given projection subassembly with respect to the projection screen define the angle of incidence of the given light ray upon the projection screen, as well as a manner in which (notably, an angle at which) the given light ray would be transmitted or reflected from the projection screen.

Optionally, the angle of transmission or reflectance of the given light ray reduces going away from a periphery of the projection screen to a centre of the projection screen. Alternatively, optionally, the angle of transmission or reflectance of the given light ray increases going away from a periphery of the projection screen to a centre of the projection screen.

In an example, the projection screen may operate in the reflective mode. When the relative position and orientation of the given projection subassembly with respect to the projection screen is such that side rays of a light beam emitted by the given projection subassembly might be lost in case of typical reflection from the projection screen, the at least one layer of optical elements may be used in the projection screen to modify angles of reflection of the side rays in a manner that the side rays are directed towards the eye-box of the at least one viewer instead of getting lost in space. In such an example, an angle of reflection of a light ray (of the emitted light beam) may vary based on the location on the projection screen at which the light ray is incident in a manner that the angle of reflection reduces going away from a periphery of the projection screen to a centre of the projection screen. In this way, the projection screen is configured to reflect the light rays incident thereupon in a non-traditional manner. In the reflective mode, reflective properties of the projection screen are a mix of reflective properties of a classical reflector (for example, a mirror reflector) and a retroreflector. By modification of the angle of reflectance, a reflecting angle for each light ray incident upon the projection screen is tailored to ensure effective utilization of all the incident light rays for producing the given 3D image. Optionally, the reflecting angle for different light rays is different, wherein the reflecting angle varies (namely, changes) gradually across the projection screen. Optionally, a reflecting angle for a light ray incident on a central region of the projection screen is greater than a reflecting angle for a light ray incident on a peripheral region of the projection screen. In other words, the reflecting angle reduces on going from the centre of the projection screen to the periphery of the projection screen. Herein, the "reflecting angle" for a given light ray is an angle between a portion of the given light ray that is incident on the projection screen (namely, an incident portion of the given light ray) and another portion of the given light ray that is reflected from the projection screen (namely, a reflected portion of the given light ray). Optionally, the at least one functional layer provides the reflective properties of the projection screen. As an example, a layer of tailored lenslet arrays may provide the reflective properties of the projection screen. As another example, digitally designed holographical optical elements may provide the reflective properties of the projection screen.

In another example, the projection screen may operate in the transmissive mode. In such an example, different light rays (of different light beams) emitted by different point-like light sources may be transmitted through the projection screen in a manner that upon transmission, angles formed by the different light rays with a plane of the projection screen are only marginally different from each other. Then, the at least one layer of optical elements may be used in the projection screen to increase angles of transmission of the different light rays for expanding a viewable angle in which the generated 3D image can be viewed. In this manner, angle expansion can be performed at the projection screen in a manner that an angle formed by farthest light rays (amongst the different light rays) at a point of incidence on the projection screen is smaller than an angle formed by the farthest light rays upon transmission from the projection screen.

Optionally, the at least one layer of optical elements that is employed to modify the angle of transmission or reflectance comprises one or more of: micro-optical elements (for example, such as lenslet arrays), planar holographical optical elements, diffractive optical elements, metasurfaces.

In an example, the at least one layer of optical elements may be implemented as two layers of lenslet arrays. The two layers of the lenslet arrays form, for example, an optical layout similar to that in Keplerian telescope, where two lenslets with different focal lengths are placed apart each other by a distance equal to a sum of their corresponding focal lengths. In another example, when the projection screen is large in size, the at least one layer of optical elements may be implemented as two layers of lenslet arrays, wherein each layer of lenslet arrays comprises a tiled arrangement of a plurality of lenslet arrays. In yet another example, the at least one layer of optical elements may be implemented as planar holographical optical elements in conjunction with lenslet arrays and/or metasurfaces.

Optionally, in the display system, the projection unit and the projection screen are integrated together into a single consolidated unit.

Throughout the present disclosure, the term "processor" refers to hardware, software, firmware or a combination of these, suitable for controlling the operation of the display system. The processor is coupled to at least the projection unit. Optionally, in some implementations, the processor is also coupled to the projection screen.

In some implementations, the processor is external to the projection unit and is implemented as a stand-alone device such as an external computer or other computational device. In other implementations, the processor is implemented as a part of the projection unit. In such implementations, the processor can be implemented either as an integral part, or an external part of the projection unit.

Optionally, the projection unit and the processor are integrated together into a single consolidated unit. In such a case, the processor is implemented as an integral part of the projection unit.

Throughout the present disclosure, the "three-dimensional data" pertaining to a scene refers to data indicative of visual information and three-dimensional geometry of the scene. The 3D data pertaining to the scene comprises data indicative of at least: visual characteristics of objects within the scene, depths of the objects within the scene. Optionally, the 3D data pertaining to the scene further comprises data indicative of at least one of: relative arrangement of the objects within the scene, textures of the objects within the scene, materials of the objects within the scene, lighting within the scene, shadows within the scene, surface normal within the scene.

In an embodiment, the 3D data pertaining to the scene is in form of a 3D textured mesh corresponding to the scene. In another embodiment, the 3D data pertaining to the scene is in form of an environment map corresponding to the scene. Notably, the environment map is a data structure comprising comprehensive information pertaining to the scene. It will be appreciated that the 3D data pertaining to the scene could be in any suitable 3D-compliant form (for example, such as 2D images, 3D images, depth arrays, and the like).

Optionally, the processor is configured to:
receive encoded data from an image source; and
decode the encoded data to generate the three-dimensional data pertaining to the scene.

In an embodiment, a processing unit of the image source is configured to encode 3D input data pertaining to the scene to generate the encoded data. In this regard, the processing unit of the image source is configured to communicate the encoded data to the processor of the display system. The encoded data could be received at the processor as a stream of data. In an embodiment, when encoding the 3D input data to generate the encoded data, the processing unit is configured to employ an encoding algorithm. The encoding algorithm may be a lossy encoding algorithm or a lossless encoding algorithm. In an embodiment, when decoding the encoded data to generate the 3D data pertaining to the scene, the processor is configured to employ a decoding algorithm. The decoding algorithm performs an inverse operation of an encoding operation performed by the encoding algorithm (at the processing unit of the image source).

Alternatively, optionally, the processor is configured to receive the 3D data pertaining to the scene from an image source. In an embodiment, a processing unit of the image source is configured to execute software for interpreting 3D input data pertaining to the scene and processing the 3D input data to generate the 3D data pertaining to the scene. In this regard, the processing unit of the image source is configured to communicate the 3D data pertaining to the scene to the processor of the display system.

Yet alternatively, optionally, the processor is configured generate the 3D data pertaining to the scene.

It will be appreciated that the image source is optionally implemented as a computing device, a multimedia streaming server, a television broadcast station, and the like. The computing device may, for example, be a personal computer, a laptop computer, a gaming console, a graphics processing unit, and the like. Moreover, the 3D input data optionally pertains to a 3D game, a 3D movie, a 3D educational video, a 3D extended-reality video, a 3D simulation, and the like.

Throughout the present disclosure, the "image data" of a given 3D image refers to data (of the given 3D image) that is in a required 3D graphics format compatible with components of the display system. Notably, since the image data details how the one or more projection subassemblies of the display system will be operated, the image data is compatible with requirements of components of the one or more projection subassemblies.

Optionally, the image data of the given 3D image comprises a plurality of two-dimensional (2D) image views (or slices) of the given 3D image. Optionally, a number of the 2D image views of the given 3D image is equal to a number of point-like light sources of the array.

When processing the 3D data pertaining to the scene to generate the image data of the given 3D image, the processor reconfigures the 3D data pertaining to the scene in accordance with the required 3D graphics format compatible with components of the display system, to generate the image data. It will be appreciated that the processor can be pre-programmed to work with hardware configuration of the components of the display system (as it is pre-fed into the processor at the time of manufacturing the display system), and is therefore able to accurately generate the image data of the given 3D image (from the 3D data pertaining to the scene) that is suitable for use with the one or more projection subassemblies. Alternatively the processor can be configured via calibration procedure to work with given hardware configuration.

Optionally, the processor is configured to process a stream of 3D data pertaining to the scene to generate a stream of image data of a stream of 3D images.

Optionally, the display apparatus further comprises a configuration of sensors for tracking a gaze direction and/or a pose of at least one viewer,
wherein, when processing the three-dimensional data, the processor is configured to generate the image data of the given three-dimensional image, based on the gaze direction and/or the pose of the at least one viewer.

Optionally, the configuration of sensors is communicably coupled to the image source. The configuration of sensors may be communicably coupled to the image source either directly, or via a data communication network. It will be appreciated that the data communication network may be wired, wireless, or a combination thereof. Examples of the data communication network may include, but are not limited to, Internet, a local network (such as, a TCP/IP-based network, an Ethernet-based local area network, an Ethernet-based personal area network, a Wi-Fi network, and the like), and a short range radio network (such as Bluetooth®).

Additionally or alternatively, optionally, configuration of sensors is communicably coupled to the processor.

Optionally, the configuration of sensors is implemented as one or more of: a gaze-tracking unit, a motion-tracking unit, a motion sensor, a proximity sensor, a visible-light camera, an infrared camera.

Optionally, the processor obtains the gaze direction and/or the pose of the at least one viewer from the configuration of sensors either directly, or via the image source. When processing the 3D data (pertaining to the scene), the processor utilizes the obtained gaze direction and/or pose of the at least one viewer to generate gaze-consistent and/or pose-consistent image data of the given 3D image. As a result, when the given 3D image is displayed, the given 3D image appears realistic from a gaze direction and/or a perspective of the at least one viewer.

The processor displays the given three-dimensional image, via the one or more projection subassemblies of the projection unit. In each of the one or more projection subassemblies, the controller is configured to multiplex operations of individual point-like light sources of the array and the spatial light modulator in the time-sequential manner, based on the image data of the given three-dimensional image, to display a plurality of segments of the given three-dimensional image sequentially. The image data describes the manner in which the components (notably, the point-like light sources of the array and the spatial light modulator) of the one or more projection subassemblies are required to operate for displaying the given 3D image.

By, "multiplex operations of individual point-like light sources of the array and the spatial light modulator in the time-sequential manner", it is meant that at a given time, only one point-like light source among the point-like light sources of the array is switched on to emit a light beam to illuminate the spatial light modulator. Simultaneously at the given time, the controller renders at the spatial light modulator, a portion of the image data of the given 3D image that corresponds to the point-like light source that is currently switched on. Upon modulation by the spatial light modulator at the given time, the emitted light beam illuminates the projection screen to display one or more segments (amongst the plurality of segments) of the given 3D image. The portion of the image data, which is rendered at the given time, corresponds to the one or more segments of the given 3D image. At the given time, only the one or more segments corresponding to the point-like light source that is switched on, are displayed. Therefore, by time-sequentially switching on different point-like light sources of the array, different light beams illuminate the spatial light modulator at different times to display the plurality of segments of the given 3D image. It will be appreciated that the aforesaid multiplexing is performed rapidly and efficiently in the time-sequential manner such that the at least one viewer of the given 3D image is unable to perceive separate segments of the given 3D image. As a result, the at least one viewer perceives the given 3D image as a composite image.

The controller is configured to render, in the time-sequential manner, different portions of the image data of the given 3D image that correspond to different point-like light sources that are switched on at different times. The controller performs said rendering operation at the spatial light modulator. As an example, when the array of point-like light sources comprises three light sources L1, L2, and L3, the controller is configured to render at the spatial light modulator—a 2D image slice i1 corresponding to the light source L1 at a time when L1 is switched on, a 2D image slice i2 corresponding to the light source L2 at a time when L2 is switched on, and a 2D image slice i3 corresponding to the light source L3 at a time when L3 is switched on.

Notably, a given light beam emitted by a given point-like light source forms a light cone (namely, a three-dimensional light cone, or an illumination cone) which illuminates the spatial light modulator at a specific angle. When multiplexing the operations of individual point-like light sources of the array and the spatial light modulator in the time-sequential manner, different light cones formed by emitted light beams from different point-like light sources of the array illuminate the spatial light modulator at slightly different angles. Subsequently, upon being incident on the projection screen, the different light cones illuminate different regions of the projection screen to display different segments of the given 3D image.

It will be appreciated that the number of point-like light sources of the array is correlated with the number of segments of the given 3D image. In an embodiment, the number of point light sources of the array is equal to the number of segments of the given 3D image. In such a case, each point-like light source of the array displays one segment of the given 3D image. In another embodiment, the number of point light sources of the array is lesser than the number of segments of the given 3D image. In such a case, each point-like light source of the array displays one or more segments of the given 3D image.

Throughout the present disclosure, the term "segment" of the given 3D image refers to a 3D portion of the given 3D image. A given segment of the given 3D image is a 3D pyramidal portion of the given 3D image. The given segment of the given 3D image occupies 3D space in an environment. It will be appreciated that the given 3D segment may or may not be a continuous 3D portion of the given 3D image. In some implementations, the given 3D segment is a continuous 3D portion of the given 3D image, whereas in other implementations, the given 3D segment is made up of multiple discontinuous 3D portions of the given 3D image.

Optionally, the plurality of segments are non-overlapping. Alternatively, optionally, the plurality of segments overlap at least partially. From any point within a region of overlap on the projection screen, light rays passing through said point can be traced back to their corresponding point-like light sources.

Notably, the plurality of segments of the given 3D image are displayed rapidly one after the other within a time period, such that they collectively produce the 3D image. The time period is selected to be such that the at least one viewer is unable to distinctly perceive different constituent segments of the given 3D image. The at least one viewer is only able to perceive the given 3D image as a composite whole. It will be appreciated that the time period of displaying the plurality of segments depends on a required refresh rate of the display system. As an example, the required refresh rate of the display system may be greater than 60 Hertz (Hz). The required refresh rate of the display system may be, for example, 60 Hz, 65 Hz, 70 Hz, 75 Hz, 80 Hz, 85 Hz, 90 Hz, and so on.

Optionally, a time period of displaying a given segment amongst the plurality of segments of the given 3D image lies in a range of 200 microseconds to 1.5 milliseconds (notably, 1500 microseconds). The time period of displaying the given segment may, for example, be from 200, 300, 400, 500, 600, 700, 800, 900, 1000, 1100, 1200, 1300, or 1400 microseconds up to 300, 400, 500, 600, 700, 800, 900, 1000, 1100, 1200, 1300, 1400, or 1500 microseconds. It will be appreciated that the time period of displaying the given segment depends upon at least one of: the number of segments of the given 3D image, a colour-scheme employed for displaying the given 3D image.

Optionally, the one or more projection subassemblies are arranged in a predefined arrangement, a given segment of the given three-dimensional image being produced by a plurality of sub-segments displayed contemporaneously by respective projection assemblies, wherein the processor is configured to determine a given sub-segment of the given segment that is to be displayed via a given projection subassembly, based on a total number of projection subassemblies in the projection unit and a position and orientation of the given projection subassembly in the predefined arrangement, wherein, when displaying, the processor is configured to display the given sub-segment of the given segment via the given projection subassembly.

Optionally, in this regard, the one or more projection subassemblies comprises a plurality of projection subassemblies. In an embodiment, each of the plurality of projection subassemblies is employed for displaying the given 3D image. In another embodiment, some projection subassemblies of the plurality of projection subassemblies are employed for displaying the given 3D image, whilst other projection subassemblies are not employed for displaying the given 3D image. In such a case, the other projection subassemblies may be switched off whilst they are not in use.

Optionally, controllers of the plurality of projection subassemblies are communicably coupled to the processor. Optionally, the processor is configured to synchronously control the plurality of projection subassemblies via their controllers.

Optionally, upon generating the image data of the given 3D image, the processor is configured to redistribute a plurality of portions of the image data according to the plurality of projection subassemblies.

Throughout the present disclosure, the term "sub-segment" of the given segment of the given 3D image refers to a 3D sub-portion of the given segment. In an embodiment, the given segment comprises a plurality of 3D sub-to portions, wherein the plurality of 3D sub-portions are a plurality of sub-segments of the given segment. It will be appreciated that the plurality of sub-segments of the given segment may or may not be continuous 3D sub-portions of the given segment. Optionally, the plurality of sub-segments of the given segment are continuously arranged with respect to each other. Alternatively, optionally, the plurality of sub-segments of the given segment are spaced apart from each other (namely, are discontinuous from each other).

Optionally, when producing the given segment of the given 3D image, each of the plurality of projection subassemblies contemporaneously produces one or more corresponding sub-segments amongst the plurality of sub-segments of the given segment. Such contemporaneous production of multiple sub-segments by the plurality of projection subassemblies is made possible due to presence of different, independent spatial light modulators of the plurality of projection subassemblies.

It will be appreciated that the processor "knows" the hardware configuration of the components of the display system, the predefined arrangement of the one or more projection subassemblies, and properties of the projection screen, as such information is pre-fed into the processor at the time of manufacturing the display system. Therefore, based on the total number of projection subassemblies in the projection unit and the position and orientation of the given projection subassembly in the predefined arrangement, the processor accurately determines how and where light rays (which are in form of a light cone) from each projection subassembly would be incident upon the projection surface. As a result, the processor optionally determines the given sub-segment of the given segment that is to be displayed via the given projection subassembly. It will be appreciated that the processor ensures that each sub-segment of each segment of the given 3D image is displayed by at least one projection subassembly. Moreover, the processor displays the given sub-segment of the given segment via the given projection subassembly. In this regard, the controller is configured to multiplex operations of individual point-like light sources of a given array of the given projection subassembly and a given spatial light modulator in a time-sequential manner, based on image data of the given 3D image, to display the given sub-segment of the given segment.

Moreover, it will be appreciated that utilization of multiple projection subassemblies enables utilization of larger projection screens, as a larger area of such projection screens can be filled using the multiple projection subassemblies. When the plurality of segments and/or the plurality of sub-segments overlap at least partially, to ensure improved angle diversity and higher uniformization of image brightness across an area of the projection screen as well as over multiple viewing angles.

For illustration purposes only, there will now be considered an example implementation wherein the projection unit comprises four projection subassemblies. The given 3D image may be composed of six segments, wherein each of the six segments may comprise four sub-segments. The processor determines one or more segments to be displayed for each projection subassembly, based on the number of projection subassemblies (notably, equal to four in this example implementation) and the positions and orientations of the four projection subassemblies in their predefined arrangement.

In a first case, when displaying any segment amongst the six segments, the four projection subassemblies contemporaneously produce one corresponding sub-segment amongst the four sub-segments.

In a second case, when displaying any segment amongst the six segments, two projection subassemblies amongst the four projection subassemblies contemporaneously produce two corresponding sub-segments amongst the four sub-segments, whereas other two projection subassemblies amongst the four projection subassemblies may be switched off.

In an embodiment, the plurality of sub-segments, when displayed, at least partially overlap to produce the given segment on the projection screen. In such a case, the plurality of sub-segments, when displayed, may overlap either partially or fully to produce the given segment on the projection screen. In particular, a plurality of light beams (in form of a plurality of light cones) emitted contemporaneously from the plurality of projection subassemblies at least partially overlap to produce the given segment on the projection screen. The predefined arrangement of the one or more projection subassemblies defines a manner in which the plurality of segments at least partially overlap. In particular, the predefined arrangement of the one or more projection subassemblies defines at least an extent and a region of overlap of the plurality of segments.

It will be appreciated that optionally when the plurality of sub-segments at least partially overlap to produce the given segment, a resultant angular resolution of the given segment is improved as compared to an original angular resolution of the plurality of sub-segments. In the region of overlap the resultant angular resolution of the given segment is higher than original angular resolutions of the plurality of sub-segments. Upon overlap, a higher density of light rays is incident upon the region of overlap, as compared to an original density of light rays that was incident upon said region prior to overlap. In this way, the resultant angular resolution of the given segment (and subsequently, an overall angular resolution of the given 3D image) can be considerably improved to present high-resolution 3D images to the at least one viewer of the display system. It will be appreciated that the overlap between the plurality of sub-segments may or may not vary.

The term "angular resolution" of a given image (such as the given 3D image) or its portion (notably, the plurality of segments, and optionally, the plurality of sub-segments) refers to a number of pixels per degree or a number of voxels per degree of an angular width of the given image or its portion, wherein the angular width is measured from the perspective of the at least one viewer's eye. Notably, an increase in the angular resolution results in an increase in the number of pixels or voxels per degree and a decrease in an angular pixel size or an angular voxel size. A high angular resolution of the given image or its portion is indicative of high visual detail within the given image or its portion.

Optionally, the one or more projection subassemblies are arranged on a curved surface. The curved surface may, for example, be part of a circumference of a circular element. Alternatively, optionally, the one or more projection subassemblies are arranged on a flat surface. It will be appreciated that the curved surface or the flat surface serves as a supporting substrate or a base upon which the one or more projection subassemblies are arranged in the predefined arrangement. The predefined arrangement of the one or more projection subassemblies may be a 1D arrangement (for example, such as a linear horizontal arrangement, or a linear vertical arrangement), a 2D arrangement (for example, such as a rectangular arrangement, a circular arrangement, and the like), or a 3D arrangement.

Optionally, the display system further comprises an optical element for enlarging a size of light beams emitted by the one or more projection subassemblies. Such an optical element is placed on an optical path of the light beams emitted by the point-like light sources. Optionally, the optical element for enlarging the size of light beams is implemented as at least one of: an optical lens, a prism, a holographic optical element, a planar optical element, a Fresnel lens, a metasurface lens.

The display system described hereinabove can be beneficially employed for a large number of diverse real-world applications. These real-world applications extend across domains such as entertainment, education, gaming, military, design modelling, and the like.

In a first example use case, the display system can be used in an indoor real-world environment, wherein the projection screen may be mounted on a surface (for example, such as a wall) in the indoor real-world environment and the projection unit and the processor may be arranged at a location (in the indoor real-world environment) that faces the surface.

In a second example use case, the display system can be used in an automotive head-up display system. The automotive head-up display system is employed in automobiles such as cars, trucks, aircrafts, and the like. In some implementations, the projection screen is implemented as a translucent or transparent screen that covers a windshield of an automobile. The translucent or transparent screen can be implemented by way of metasurfaces, holographical optical elements or a combination thereof. In other implementations, the projection screen is implemented as an intermediate translucent or transparent screen that is arranged between a driver of an automobile and a windshield of the automobile. In such a case, light rays constituting the given 3D image is reflected off the windshield to be visible to the driver, wherein the windshield is coated with a reflective film. The reflective film is implemented for example as narrow band-pass filters to facilitate efficiency of reflection or alternatively, as reflectors incorporating elements of holographic optical elements, metasurfaces, or any combination thereof.

The present disclosure also relates to the projection unit as described above. Various embodiments and variants disclosed above apply mutatis mutandis to the projection unit.

Optionally, in the projection unit, the one or more projection subassemblies are arranged in a predefined arrangement, a given segment of the given three-dimensional image being produced by a plurality of sub-segments displayed contemporaneously by respective projection assemblies, wherein the processor is configured to determine a given sub-segment of the given segment that is to be displayed via a given projection subassembly, based on a total number of projection subassemblies in the projection unit and a position and orientation of the given projection subassembly in the predefined arrangement, wherein, when displaying, the processor is configured to display the given sub-segment of the given segment via the given projection subassembly.

The present disclosure also relates to the method as described above. Various embodiments and variants disclosed above apply mutatis mutandis to the method.

Optionally, in the method, the one or more projection subassemblies are arranged in a predefined arrangement, a given segment of the given three-dimensional image being produced by a plurality of sub-segments displayed contemporaneously by respective projection assemblies, wherein the method further comprises determining a given sub-segment of the given segment that is to be displayed via a given projection subassembly, based on a total number of projection subassemblies in the projection unit and a position and orientation of the given projection subassembly in the predefined arrangement, wherein the step of displaying comprises displaying the given sub-segment of the given segment via the given projection subassembly.

DETAILED DESCRIPTION OF THE DRAWINGS

Referring to FIG. 1, illustrated is an exemplary environment 100 in which a display system 102 for presenting three-dimensional images is used, in accordance with an embodiment of the present disclosure. The display system 102 comprises a projection screen 104, a projection unit 106, and a processor (not shown). Herein, the projection screen 104 is mounted on a surface (such as a wall) in the exemplary environment 100. A viewer 108 is shown to be seated and facing the projection screen 104. A stream of the three-dimensional images (for example, a three-dimensional video stream) is shown to the viewer 108, via the display system 102.

Figure 2:
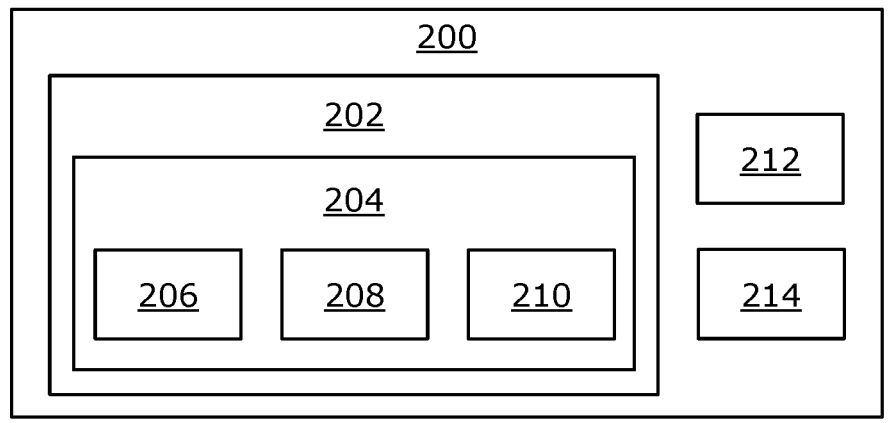
FIG. 2 and FIG. 3 illustrate a block diagram of architecture of a display system for presenting three-dimensional images, in accordance with different embodiments of the present disclosure.

Referring to FIG. 2, illustrated is a block diagram of architecture of a display system 200 for presenting three-dimensional images, in accordance with an embodiment of the present disclosure. The display system 200 comprises:
a projection unit 202 comprising one or more projection subassemblies (depicted as a projection subassembly 204), wherein each of the one or more projection subassemblies 204 comprises an array 206 of point-like light sources, a spatial light modulator 208 and a controller 210;
a projection screen 212; and
a processor 214 configured to:
process three-dimensional data pertaining to a scene to generate image data of a given three-dimensional image; and
display the given three-dimensional image, via the one or more projection subassemblies 204 of the projection unit 202, wherein, in each of the one or more projection subassemblies 204, the controller 210 is configured to multiplex operations of individual point-like light sources of the array 206 and the spatial light modulator 208 in a time-sequential manner, based on the image data of the given three-dimensional image, to display a plurality of segments of the given three-dimensional image sequentially.

Figure 3:
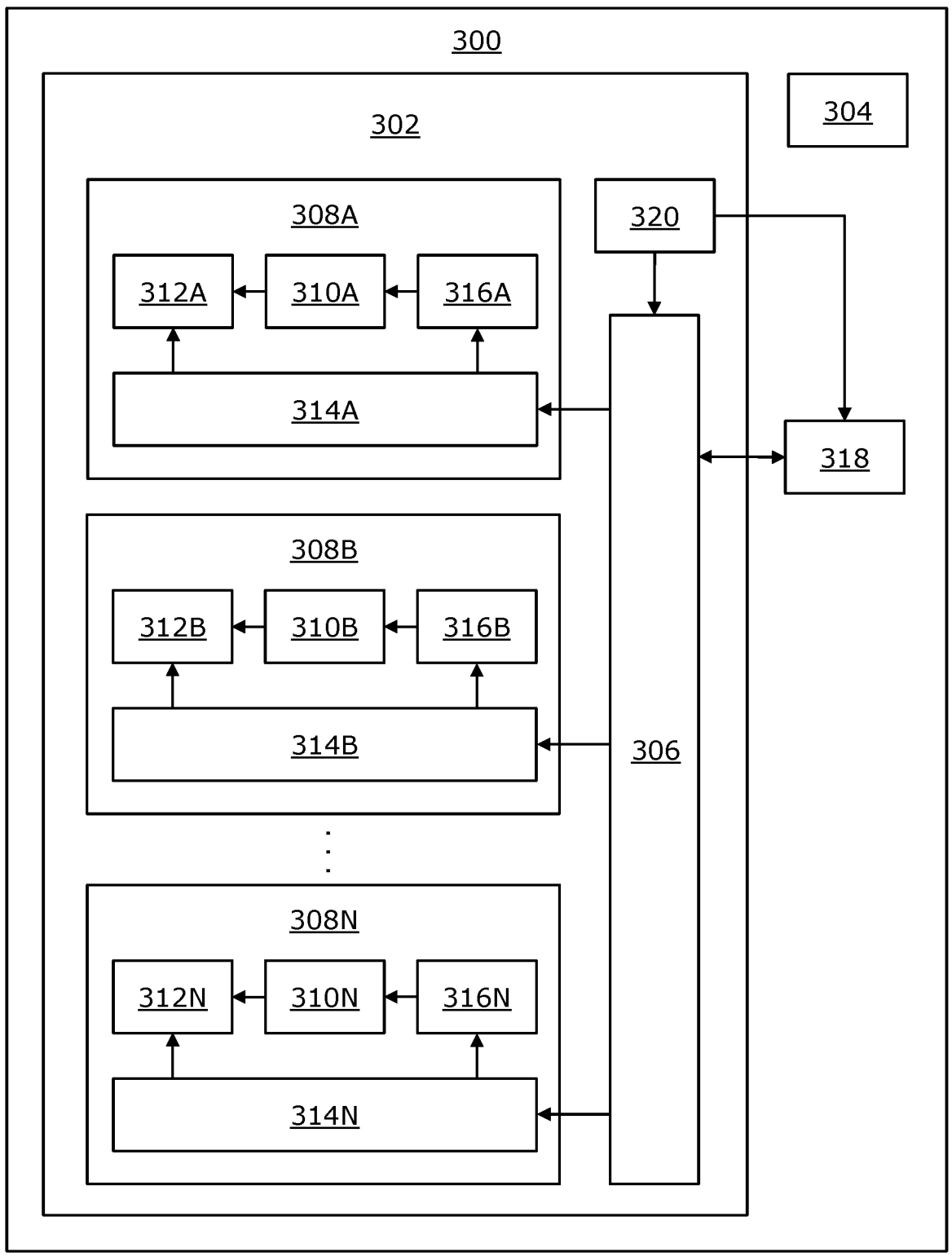

Referring to FIG. 3, illustrated is a block diagram of architecture of a display system 300 for presenting three-dimensional images, in accordance with another embodiment of the present disclosure. The display system 300 comprises a projection unit 302, a projection screen 304 and a processor 306. In the display system 300, the processor 306 is implemented as a part of the projection unit 302. The projection unit 302 comprises a plurality of projection subassemblies (depicted as projection subassemblies 308A, 308B, ..., 308N, which are hereinafter collectively referenced as 308 for sake of convenience only). Each of the plurality of projection subassemblies 308 comprises an array (depicted as arrays 310A, 310B, ..., 310N, which are hereinafter collectively referenced as 310 for sake of convenience only) of point-like light sources, a spatial light modulator (depicted as spatial light modulators 312A, 312B, ..., 312N, which are hereinafter collectively referenced as 312 for sake of convenience only), a controller (depicted as controllers 314A, 314B, ..., 314N, which are hereinafter collectively referenced as 314 for sake of convenience only) and a control circuit (depicted as control circuits 316A, 316B, ..., 316N, which are hereinafter collectively referenced as 316 for sake of convenience only). Herein, the controllers 314 are communicably coupled to the spatial light modulators 312 and the control circuits 316. The control circuits 316 are communicably coupled to the arrays 310 of point-like light sources. The controllers 314 are employed to control operation of the arrays 310 of point-like light sources via the control circuits 316. The controllers 314 synchronize operation of the arrays 310 of point-like light sources and the spatial light modulators 312. Further, each of the projection subassemblies 308 is communicably coupled (via the controllers 314) to the processor 306. The display system 300 further comprises a configuration of sensors 318 for tracking a gaze direction and/or a pose of at least one viewer. The configuration of sensors 318 is communicably coupled to the processor 306. The display system 300 further comprises an image source 320. The image source 320 is communicably coupled to the processor 306. The configuration of sensors 318 is also communicably coupled to the image source 320.

Figure 4:
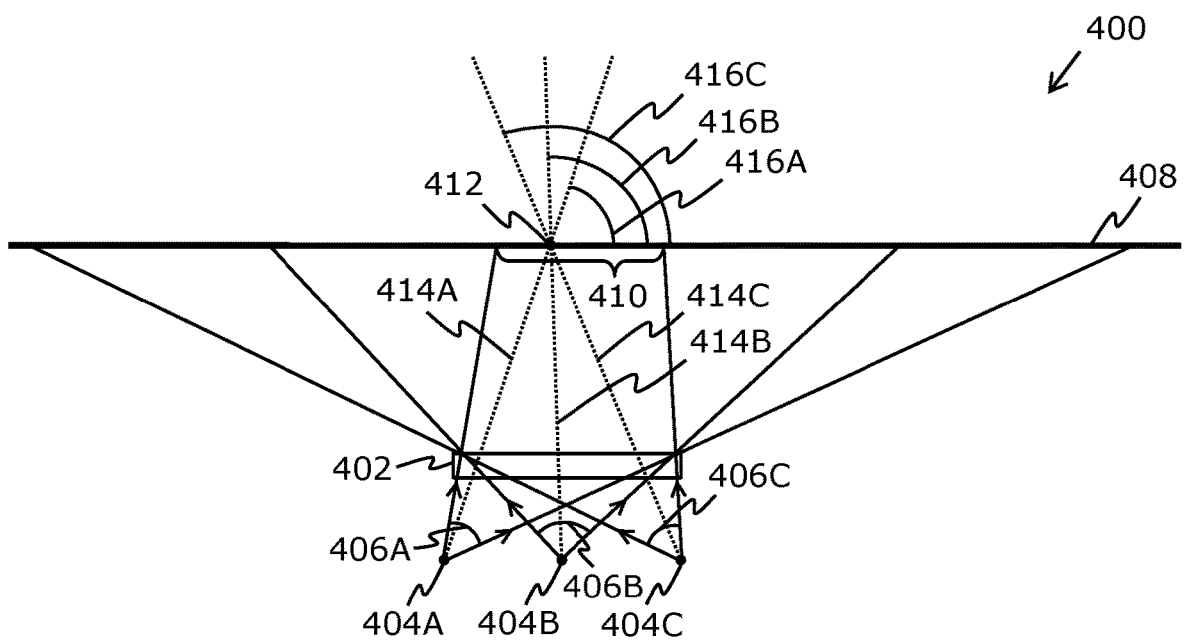
FIG. 4 illustrates an implementation of a display system for presenting three-dimensional images, in accordance with an embodiment of the present disclosure.

Referring to FIG. 4, illustrated is an implementation of a display system 400 for presenting three-dimensional images, in accordance with an embodiment of the present disclosure. Herein, a spatial light modulator 402 (of transmissive type) is illuminated by an array of point-like light sources comprising, for example, three point-like light sources 404A, 404B, and 404C at different times. Notably, the point-like light sources 404A, 404B, and 404C are very small in comparison to size of the spatial light modulator 402. As the light is emitted from the point-like light sources 404A, 404B, and 404C, light cones 406A, 406B, and 406C are formed by the point-like light sources 404A, 404B, and 404C, respectively. The light cones 406A, 406B and 406C illuminate the spatial light modulator 402 at slightly different angles. Further, each of light rays in the light cones 406A, 406B and 406C, after modulation by the spatial light modulator 402, are incident upon a projection screen 408. The light cones 406A, 406B and 406C display a plurality of segments of a given three-dimensional (3D) image at the projection screen 408. In a region 410 on the projection screen 408, the plurality of segments created by illuminating the spatial light modulator 402 by the point-like light sources 404A, 404B, and 404C would overlap. From any point (such as a point 412) within the region 410 on the projection screen 408, light rays 414A, 414B, and 414C passing through said point 412 can be traced to their corresponding point-like light sources 404A, 404B, and 404C. Consequently, when passing through the projection screen 408, the light rays 414A, 414B, and 414C form a base for multiple-segments of the given 3D image, which is generated by time sequential multiplexing of the point-like light sources 404A, 404B, and 404C in conjunction with the spatial light modulator 402. The light rays 414A, 414B, and 414C, upon being transmitted from the projection screen 408, form angles 416A, 416B, and 416C with a plane of the projection screen 408.

Figure 5:
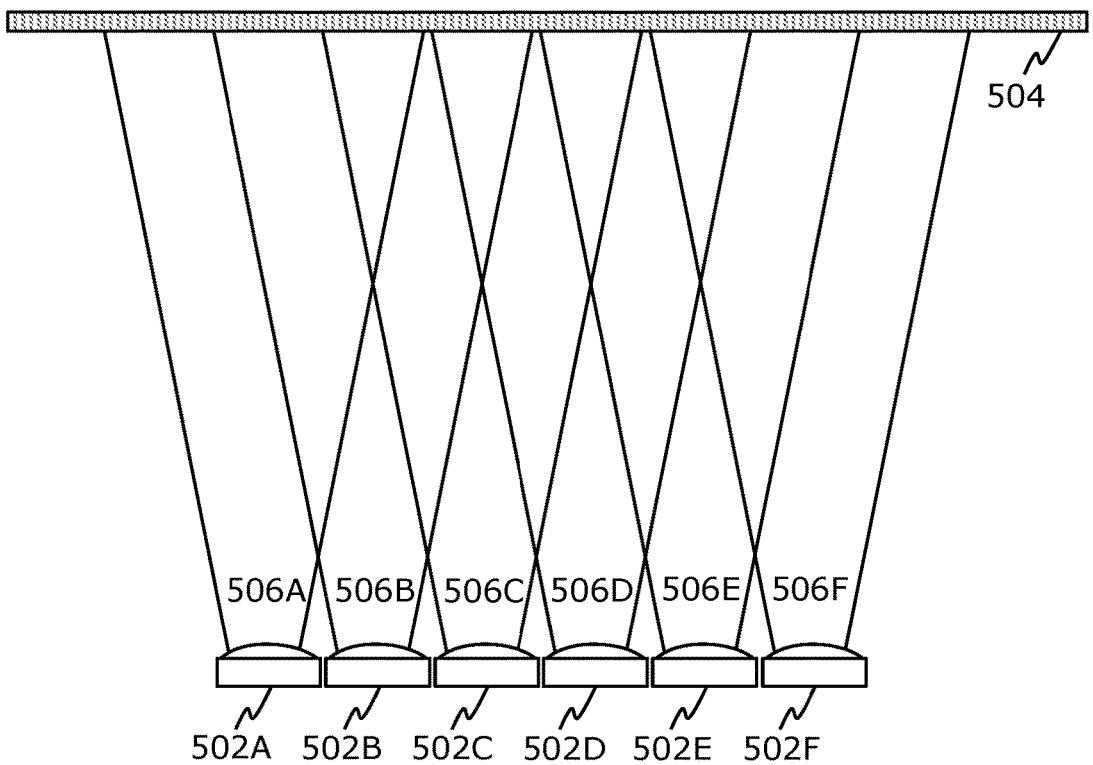
FIG. 5 and FIG. 6 illustrate different arrangements of a plurality of projection subassemblies, in accordance with different embodiments of the present disclosure.

Referring to FIG. 5, illustrated is an arrangement of a plurality of projection subassemblies 502A, 502B, 502C, 502D, 502E, and 502F, in accordance with an embodiment of the present disclosure. Herein, the projection subassemblies 502A-502F (which are hereinafter collectively referenced as 502, for the sake of convenience only) are shown to be arranged in a linear manner on a flat surface. The projection subassemblies 502A-502F are shown to emit angle-multiplexed spatially modulated light beams towards a projection screen 504 in form of corresponding light cones 506A, 506B, 506C, 506D, 506E, and 506F. The light cones 506A-506F, on being incident upon the projection screen 504, display sub-segments of a given segment of a given three-dimensional image. In such an arrangement of the projection subassemblies 502A-502F, the corresponding light cones 506A-506F partially overlap on the projection screen 504 to display partially overlapping sub-segments.

Figure 6:
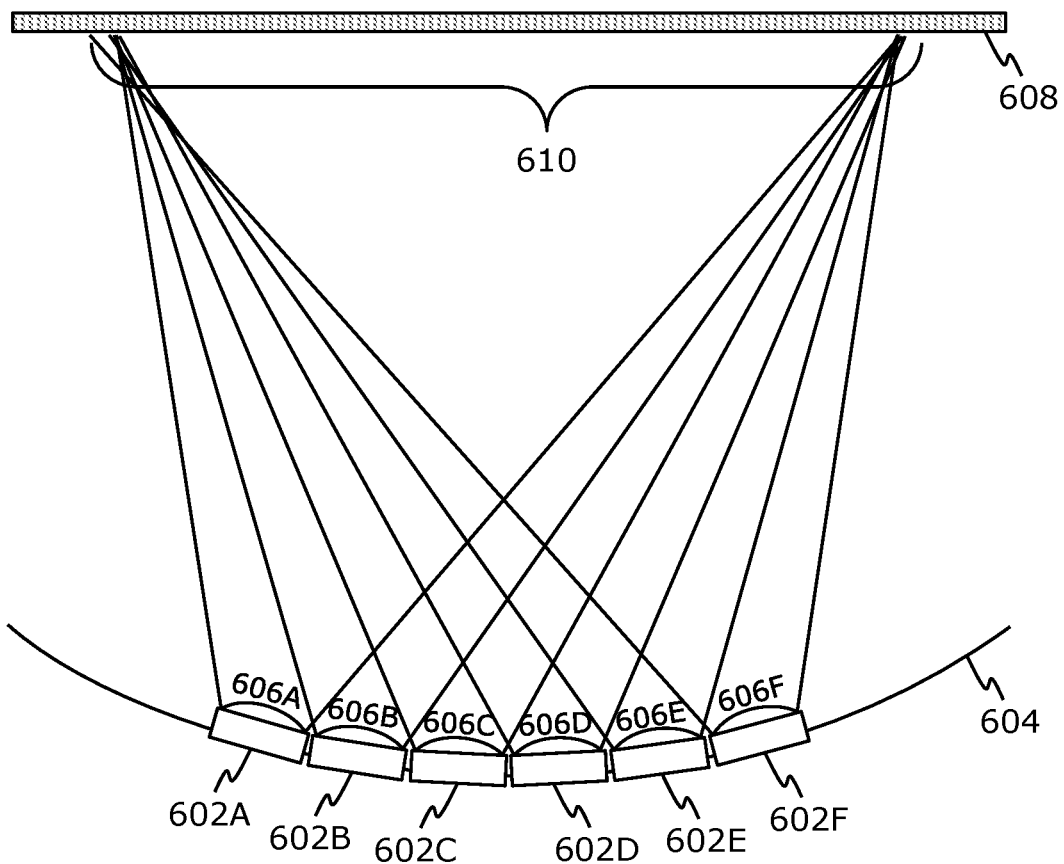

Referring to FIG. 6, illustrated is an arrangement of a plurality of projection subassemblies 602A, 602B, 602C, 602D, 602E, and 602F, in accordance with another embodiment of the present disclosure. Herein, the projection subassemblies 602A-602F (which are hereinafter collectively referenced as 602, for the sake of convenience only) are shown to be arranged on a curved surface 604. Light beams emitted by the projection subassemblies 602A-602F are in form of light cones 606A, 606B, 606C, 606D, 606E, and 606F, which partially overlap on a projection screen 608 in a region 610.

Figure 7:
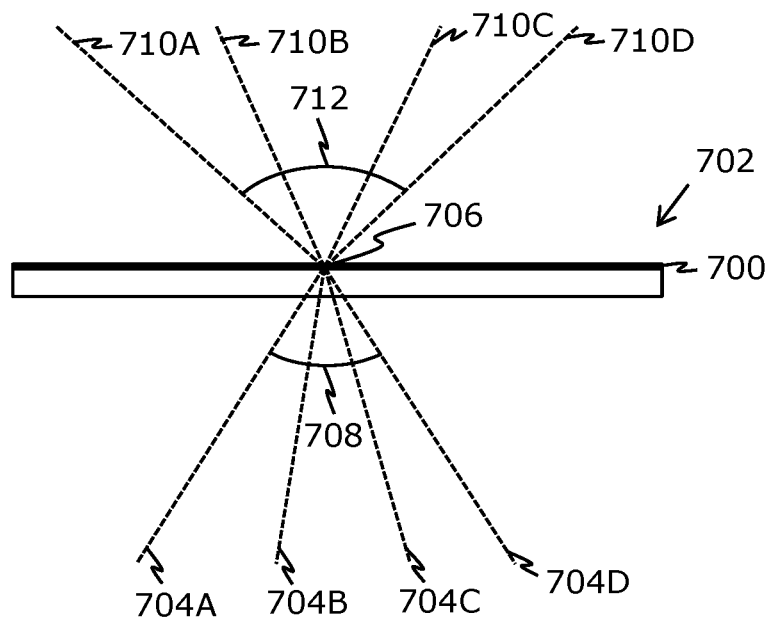
FIG. 7 illustrates how a layer of optical elements of a projection screen operating in a transmissive mode modifies an angle of transmission of light rays, in accordance with an embodiment of the present disclosure.

Referring to FIG. 7, illustrated is how a layer 700 of optical elements of a projection screen 702 operating in a transmissive mode modifies an angle of transmission of light rays, in accordance with an embodiment of the present disclosure. The layer 700 of optical elements receives light rays 704A, 704B, 704C, and 704D from different point-like light sources (not shown). The light rays 704A, 704B, 704C, and 704D are shown to be incident upon the layer 700 of optical elements at a single point 706. An angle 708 is formed between the light rays 704A and 704D. Notably, the light rays 704A-704D, upon transmission from the projection screen 702, are shown as transmitted light rays 710A, 710B, 710C, and 710D. The transmitted light rays 710A, 710B, 710C, and 710D are not a continuation of the corresponding light rays 704A, 704B, 704C, and 704D, respectively. The diffused light rays 710A, 710B, 710C, and 710D are diverted from their direct continuation of path upon an increase their angle of transmission. Therefore, an angle 712 formed between the transmitted light rays 710A and 710D is larger than its corresponding angle 708.

Figure 8:
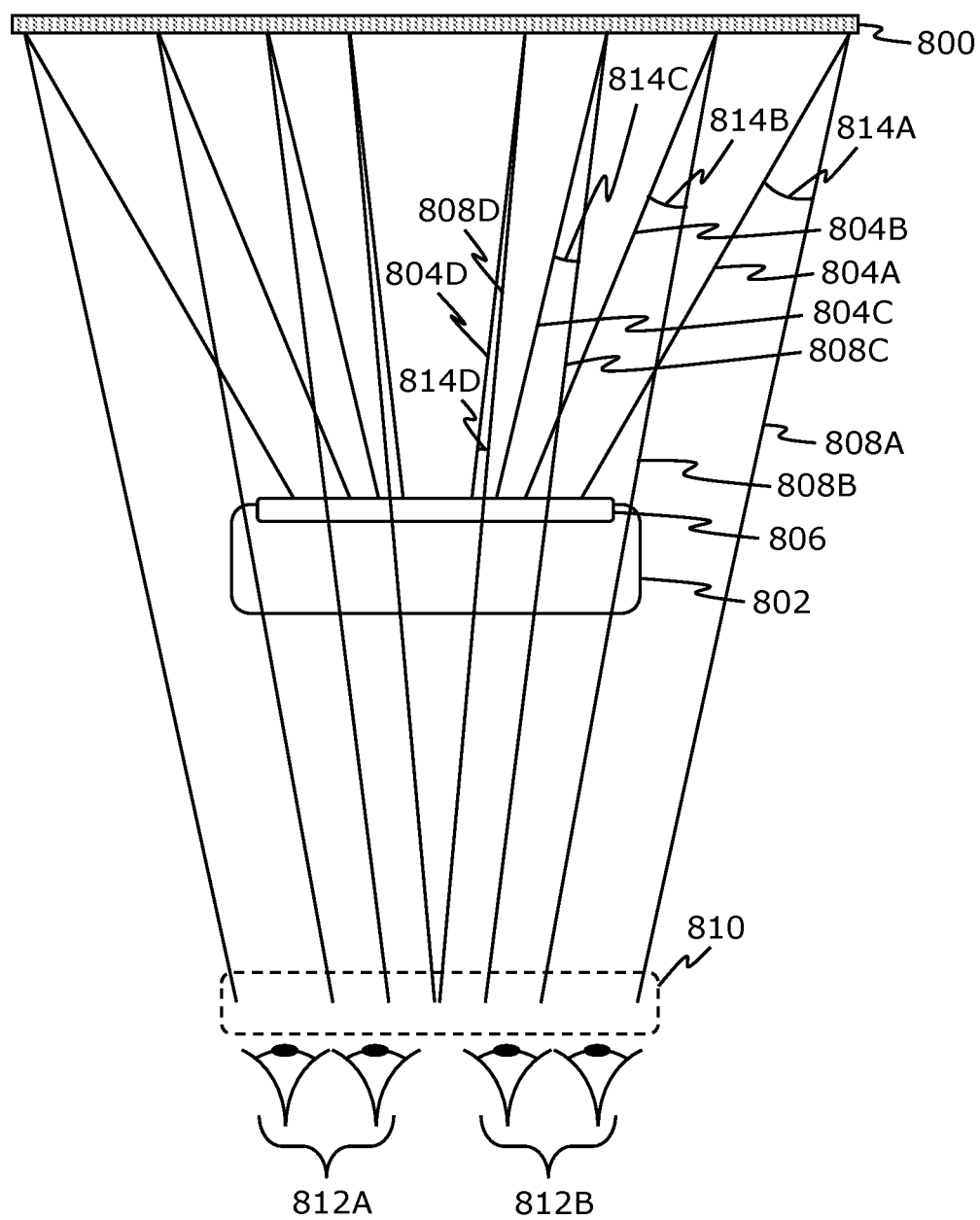
FIG. 8 illustrates a projection screen operating in a reflective mode, in accordance with an embodiment of the present disclosure.

Referring to FIG. 8, illustrated is a projection screen 800 operating in a reflective mode, in accordance with an embodiment of the present disclosure. Herein, a projection unit 802 emits light rays (referenced as light rays 804A, 804B, 804C, and 804D) towards the projection screen 800. The projection unit 802 is coupled with light shaping optics 806. The emitted light rays 804A, 804B, 804C, and 804D are reflected from the projection screen 800 and shown as reflected light rays 808A, 808B, 808C, and 808D. An angle of reflectance of the light rays 804A-804D is modified in a manner that the light rays 808A-808D are diverted towards an eye-box 810, wherein viewers 812A and 812B can observe a given three-dimensional image. A manner in which the angle of reflectance is modified across the projection screen 800 varies such that reflecting angles 814A, 814B, 814C, and 814D gradually vary across the projection screen 800.

Figure 9:
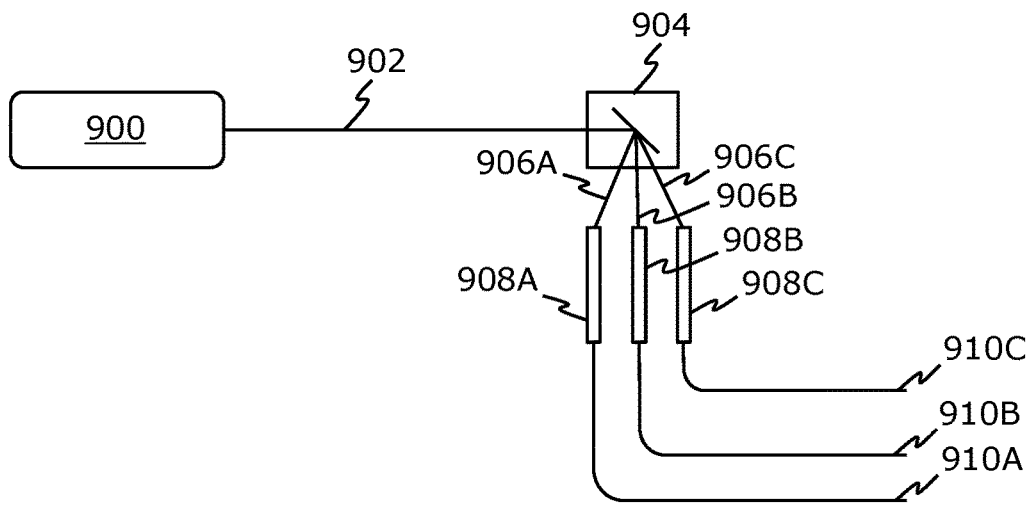
FIG. 9 illustrates an implementation of a point-like light source of an array, in accordance with an embodiment of the present disclosure.

Referring to FIG. 9, illustrated is an implementation of a point-like light source of an array, in accordance with an embodiment of the present disclosure. Herein, a laser source 900 corresponding to any of tristimulus wavelengths (such as red, green or blue wavelengths) emits a laser beam 902 that is substantially collimated. The laser beam 902 is directed towards an optical de-multiplexer 904 that is configured to divert the laser beam 902 into one of a plurality of optical paths to produce one of a plurality of diverted laser beams 906A, 906B and 906C, at a given time. One of the diverted laser beams 906A, 906B and 906C is directed towards its corresponding in-coupling optics 908A, 908B and 908C for injection into corresponding optical fibers 910A, 910B and 910C. The one of the diverted laser beams 906A, 906B and 906C then travels through one of the optical fibers 910A, 910B and 910C to be directed towards an illumination assembly (not shown) of a corresponding projection subassembly (not shown).

Figure 10:
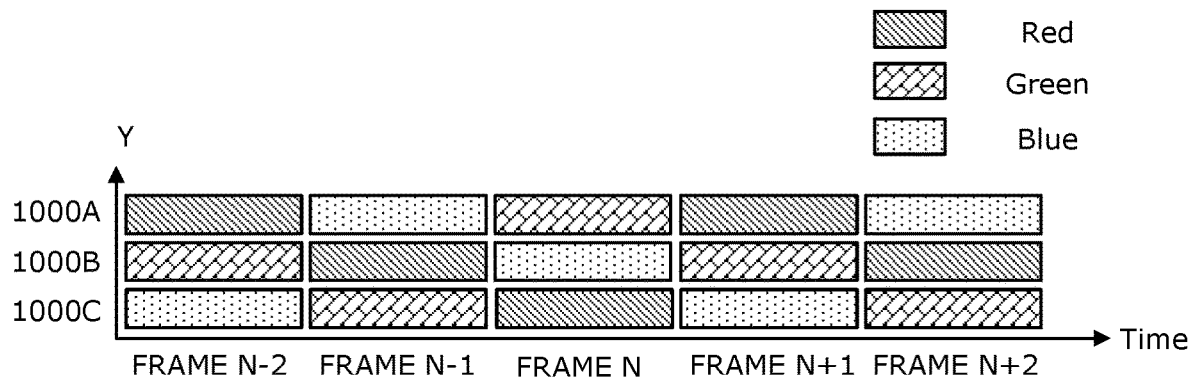
FIG. 10 illustrates a multiplexing operation involving three spatial light modulators in a time-sequential manner, in accordance with an embodiment of the present disclosure.

Referring to FIG. 10, illustrated is a multiplexing operation involving three spatial light modulators 1000A, 1000B, and 1000C in a time-sequential manner, in accordance with an embodiment of the present disclosure. Herein, the three spatial light modulators 1000A, 1000B, and 1000C (depicted along Y-axis) of three projection subassemblies (not shown) are shown to be illuminated with different wavelengths among tristimulus wavelengths for different frames. Each of the spatial light modulators 1000A-1000C are illuminated by point-like light sources of corresponding arrays emitting tristimulus wavelengths, for example, red, green and blue wavelengths (depicted as three different hatching patterns). As an example, at time t1 corresponding to frame N−2, red wavelengths illuminate the spatial light modulator 1000A, green wavelengths illuminate the spatial light modulator 1000B, and blue wavelengths illuminate the spatial light modulator 1000C in a three-dimensional image corresponding to the frame N−2. Notably, the tristimulus wavelengths illuminate a given spatial light modulator one-by-one in a time-sequential manner. Each of the spatial light modulators 1000A-1000C are evenly illuminated with a required wavelength of light for a required duration (thereby, ensuring even illumination from frame N−2 to frame N+2) and have substantially consistent color balance.

Figure 11:
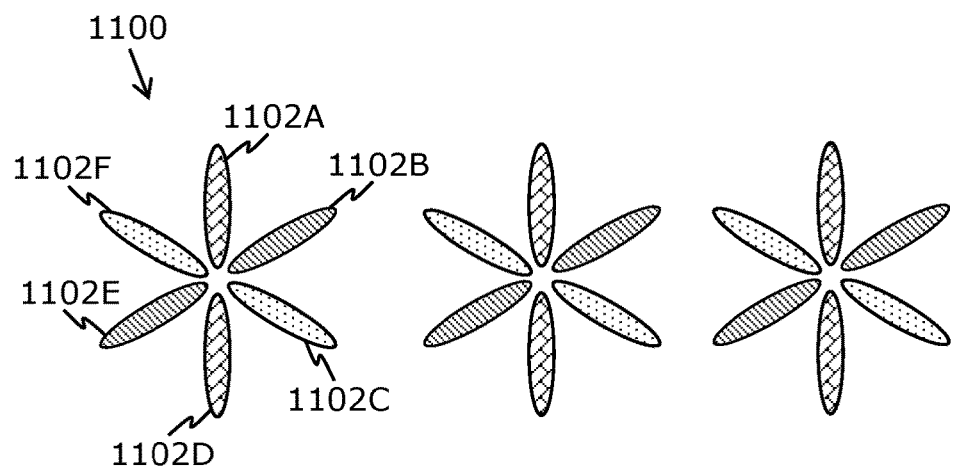
FIG. 11 illustrates three clusters of super-luminescent light-emitting diodes, in accordance with an embodiment of the present disclosure.

Referring to FIG. 11, illustrated are three clusters of super-luminescent light-emitting diodes, in accordance with an embodiment of the present disclosure. One cluster is referenced for sake of simplicity. A cluster 1100 comprises six super-luminescent light-emitting diodes 1102A, 1102B, 1102C, 1102D, 1102E, and 1102F. Herein, the super-luminescent light-emitting diodes 1102A-1102F are arranged in a circular manner and emit elliptical light beams having tristimulus wavelengths. As shown, the super-luminescent light-emitting diodes 1102B and 1102E emit red wavelengths, the super-luminescent light-emitting diodes 1102A and 1102D emit green wavelengths, and the super-luminescent light-emitting diodes 1102C and 1102F emit blue wavelengths.

Figure 12:
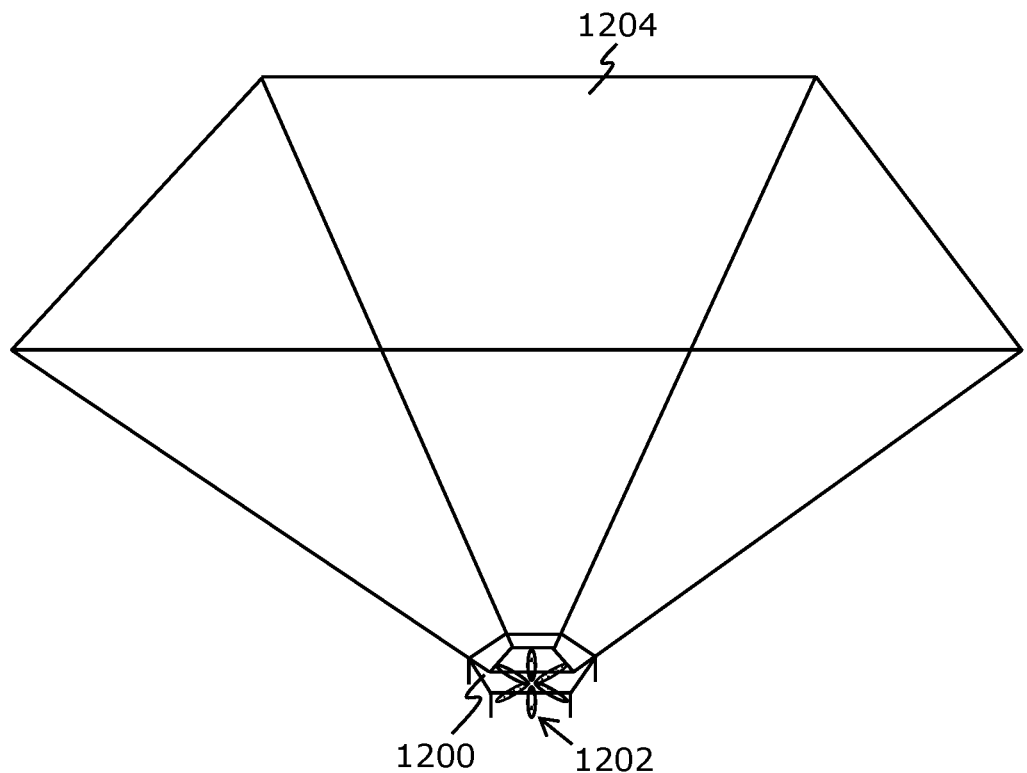
FIG. 12 illustrates an implementation of an optical element for shaping a light beam emanating from a cluster of super-luminescent light-emitting diodes, in accordance with an embodiment of the present disclosure.

Referring to FIG. 12, illustrated is an implementation of an optical element 1200 for shaping a light beam emanating from a cluster 1202 of super-luminescent light-emitting diodes, in accordance with an embodiment of the present disclosure. Herein, the cluster 1202 of super-luminescent light-emitting diodes is coupled to the optical element 1200. The optical element 1200 is configured to gather light emitted from the cluster 1202 of super-luminescent light-emitting diodes, homogenize illumination, and mixes different wavelengths of light beams (emitted by different individual SLEDs of the cluster 1202. The optical element 1200 is configured to shape a corresponding beam into a pyramidal light cone 1204 mimicking emergence of light from a near point-like light source.

Figure 13:
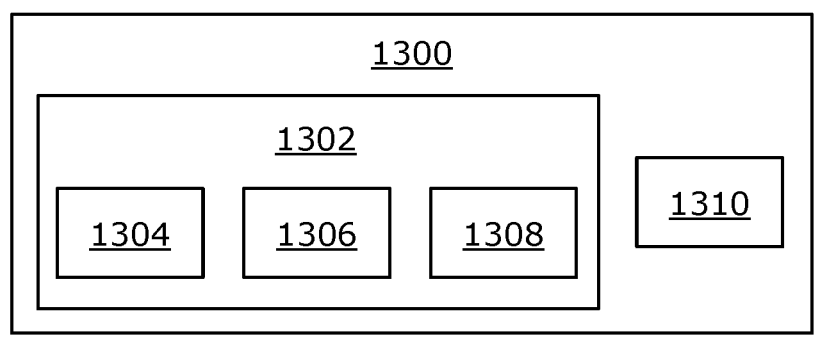
FIG. 13 illustrates a block diagram of architecture of a projection unit, in accordance with an embodiment of the present disclosure.

Referring to FIG. 13, illustrated is a block diagram of architecture of a projection unit 1300, in accordance with an embodiment of the present disclosure.

The projection unit 1300 comprises:
  one or more projection subassemblies (depicted as a projection subassembly 1302), wherein each of the one or more projection subassemblies 1302 comprises:
    an array 1304 of point-like light sources;
    at least one spatial light modulator (depicted as a spatial light modulator 1306); and
    a controller 1308; and
  a processor 1310 configured to:
  process three-dimensional data pertaining to a scene to generate image data of a given three-dimensional image; and
  display the given three-dimensional image, via the one or more projection subassemblies 1302, wherein, in each of the one or more projection subassemblies 1302, the controller 1308 is configured to multiplex operations of individual point-like light sources of the array 1304 and the at least one spatial light modulator 1306 in a time-sequential manner, based on the image data of the given three-dimensional image, to display a plurality of segments of the given three-dimensional image sequentially.

Figure 14:
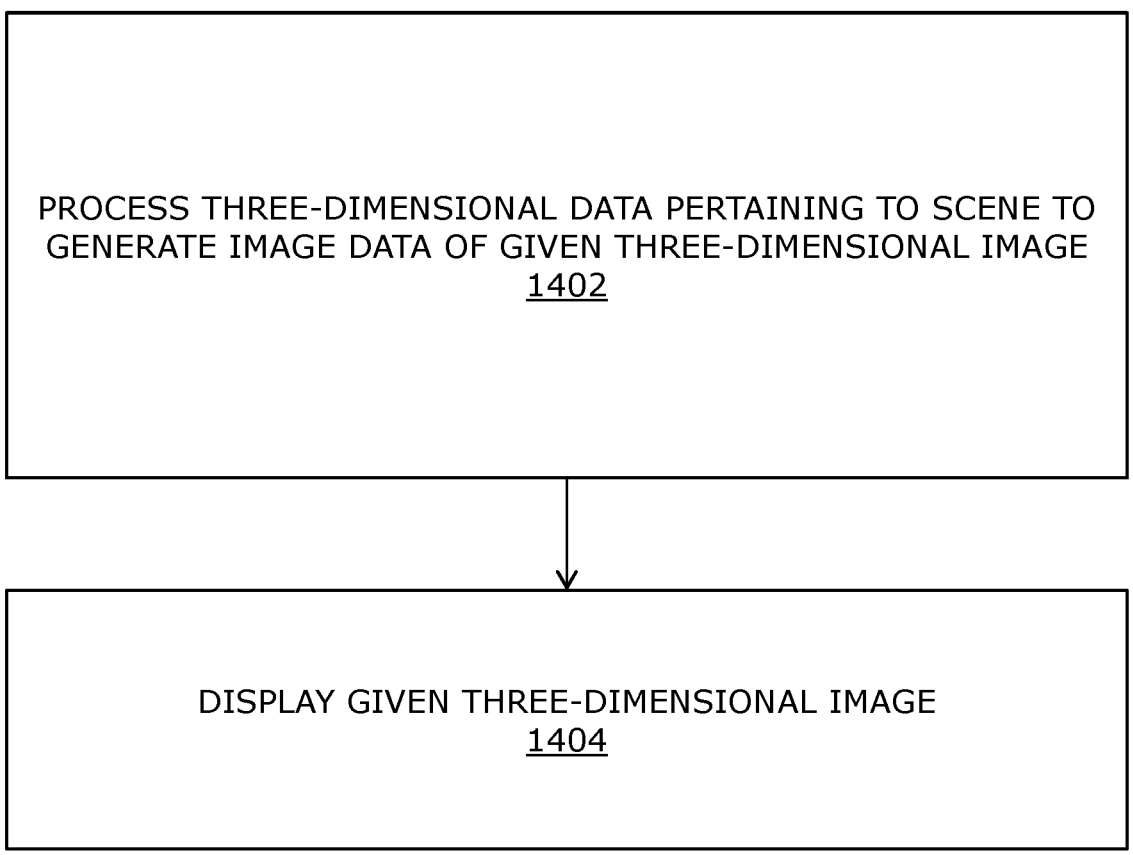
FIG. 14 illustrates steps of a method for presenting three-dimensional images, in accordance with an embodiment of the present disclosure.

Referring to FIG. 14, illustrated are steps of a method for presenting three-dimensional images, in accordance with an embodiment of the present disclosure. The method is implemented by a projection unit. At step 1402, three-dimensional data pertaining to a scene is processed to generate image data of a given three-dimensional image. At step 1404, the given three-dimensional image is displayed via one or more projection subassemblies of the projection unit. Each of the one or more projection subassemblies comprise an array of point-like light sources, at least one spatial light modulator and a controller. The step 1404 of displaying comprises multiplexing operations of individual point-like light sources of the array and the at least one spatial light modulator in a time-sequential manner, via the controller based on the image data of the given three-dimensional image, to display a plurality of segments of the given three-dimensional image sequentially.

The steps 1402 to 1404 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display system for presenting three-dimensional images, the display system comprising:
   a projection unit comprising one or more projection subassemblies, wherein each of the one or more projection subassemblies comprises an array of point-like light sources, a spatial light modulator and a controller;
   a projection screen; and
   a processor configured to:
   process three-dimensional data pertaining to a scene to generate image data of a given three-dimensional image; and
   display the given three-dimensional image, via the one or more projection subassemblies of the projection unit, wherein, in each of the one or more projection subassemblies, the controller is configured to multiplex operations of individual point-like light sources of the array and the spatial light modulator in a time-sequential manner, based on the image data of the given three-dimensional image, to display a plurality of segments of the given three-dimensional image sequentially.

2. The display system of claim 1, wherein the one or more projection subassemblies are arranged in a predefined arrangement, a given segment of the given three-dimensional image being produced by a plurality of sub-segments displayed contemporaneously by respective projection assemblies,
   wherein the processor is configured to determine a given sub-segment of the given segment that is to be displayed via a given projection subassembly, based on a total number of projection subassemblies in the projection unit and a position and orientation of the given projection subassembly in the predefined arrangement, wherein, when displaying, the processor is configured to display the given sub-segment of the given segment via the given projection subassembly.

3. The display system of claim 2, wherein the plurality of sub-segments, when displayed, at least partially overlap to produce the given segment on the projection screen.

4. The display system of claim 1, wherein the one or more projection subassemblies are arranged on a curved surface.

5. The display system of claim 1, wherein the processor is configured to:
   receive encoded data from an image source; and
   decode the encoded data to generate the three-dimensional data pertaining to the scene.

6. The display system of claim 1, further comprising a configuration of sensors for tracking a gaze direction and/or a pose of at least one viewer,
   wherein, when processing the three-dimensional data, the processor is configured to generate the image data of the given three-dimensional image, based on the gaze direction and/or the pose of the at least one viewer.

7. The display system of claim 1, wherein the one or more projection subassemblies are focus invariant.

8. The display system of claim 1, wherein each of the one or more projection subassemblies comprises at least one additional spatial light modulator.

9. The display system of claim 1, wherein the point-like light sources of the array are implemented by using at least one laser source, at least one optical de-multiplexer and a plurality of optical fibres.

10. The display system of claim 1, wherein a given point-like light source of the array is implemented as:
    at least one of: a super-luminescent light-emitting diode, a cluster of super-luminescent light-emitting diodes, a laser diode, a cluster of laser diodes; and
    an optical element for shaping a light beam.

11. The display system of claim 1, wherein a diameter of a given point-like light source lies in a range of 20 μm to 300 μm.

12. The display system of claim 1, wherein the projection screen is implemented as an anisotropic elliptical diffuser.

13. The display system of claim 1, wherein the projection screen comprises at least one layer of optical elements that are employed to modify an angle of transmission or reflectance of a given light ray emanating from a given projection subassembly and incident upon the projection screen, based on a location on the projection screen at which the given light ray is incident and a relative position and orientation of the given projection subassembly with respect to the projection screen.

14. The display system of claim 1, wherein the projection screen comprises at least one of: a layer of diffractive optical element, a volume hologram, a metasurface, a layer of liquid crystal cells.

15. The display system of claim 1, wherein the projection screen is actively switchable between a transmissive mode and a reflective mode.

16. The display system of claim 1, wherein the projection unit and the processor are integrated together into a single consolidated unit.

17. The display system of claim 1, wherein the projector screen is a metasurface screen which is actively switched between states.

18. A projection unit comprising:
one or more projection subassemblies, wherein each of the one or more projection subassemblies comprises:
an array of point-like light sources;
at least one spatial light modulator; and
a controller; and
a processor configured to:
process three-dimensional data pertaining to a scene to generate image data of a given three-dimensional image; and
display the given three-dimensional image, via the one or more projection subassemblies, wherein, in each of the one or more projection subassemblies, the controller is configured to multiplex operations of individual point-like light sources of the array and the at least one spatial light modulator in a time-sequential manner, based on the image data of the given three-dimensional image, to display a plurality of segments of the given three-dimensional image sequentially.

19. The projection unit of claim 18, wherein the one or more projection subassemblies are arranged in a predefined arrangement, a given segment of the given three-dimensional image being produced by a plurality of sub-segments displayed contemporaneously by respective projection assemblies,
wherein the processor is configured to determine a given sub-segment of the given segment that is to be displayed via a given projection subassembly, based on a total number of projection subassemblies in the projection unit and a position and orientation of the given projection subassembly in the predefined arrangement,
wherein, when displaying, the processor is configured to display the given sub-segment of the given segment via the given projection subassembly.

20. A method for presenting three-dimensional images, the method being implemented by a projection unit, the method comprising:
processing three-dimensional data pertaining to a scene to generate image data of a given three-dimensional image; and
displaying the given three-dimensional image onto a projection screen, via one or more projection subassemblies of the projection unit, each of the one or more projection subassemblies comprising an array of point-like light sources, at least one spatial light modulator and a controller, wherein displaying the given three-dimensional image further comprises multiplexing operations of individual point-like light sources of the array and the at least one spatial light modulator in a time-sequential manner, via the controller, based on the image data of the given three-dimensional image, to display a plurality of segments of the given three-dimensional image sequentially.

21. The method of claim 20, wherein the one or more projection subassemblies are arranged in a predefined arrangement, a given segment of the given three-dimensional image being produced by a plurality of sub-segments displayed contemporaneously by respective projection assemblies,
wherein the method further comprises determining a given sub-segment of the given segment that is to be displayed via a given projection subassembly, based on a total number of projection subassemblies in the projection unit and a position and orientation of the given projection subassembly in the predefined arrangement,
wherein displaying the given three-dimensional image further comprises displaying the given sub-segment of the given segment via the given projection subassembly.

* * * * *